(12) United States Patent
Ma et al.

(10) Patent No.: US 11,709,297 B2
(45) Date of Patent: Jul. 25, 2023

(54) ARTICLES COATED WITH COATINGS CONTAINING LIGHT ABSORPTION MATERIALS

(71) Applicant: Vitro Flat Glass LLC, Cheswick, PA (US)

(72) Inventors: Zhixun Ma, Pittsburgh, PA (US); Dennis J. O'Shaughnessy, Allison Park, PA (US); Adam D. Polcyn, Pittsburgh, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 157 days.

(21) Appl. No.: 16/578,659

(22) Filed: Sep. 23, 2019

(65) Prior Publication Data

US 2020/0096687 A1    Mar. 26, 2020

Related U.S. Application Data

(60) Provisional application No. 62/735,632, filed on Sep. 24, 2018.

(51) Int. Cl.
*G02B 5/22* (2006.01)
*C03C 17/36* (2006.01)

(52) U.S. Cl.
CPC ............ *G02B 5/22* (2013.01); *C03C 17/3618* (2013.01); *C03C 17/3644* (2013.01); *C03C 17/3649* (2013.01); *C03C 17/3657* (2013.01)

(58) Field of Classification Search
CPC ................................ C03C 17/366; G02B 5/22
See application file for complete search history.

(56) References Cited

U.S. PATENT DOCUMENTS 4,193,236 A    3/1980    Mazzoni et al.
4,464,874 A    8/1984    Shea, Jr. et al.
(Continued)

FOREIGN PATENT DOCUMENTS

CN    203274309 U    11/2013
JP    H6242312 A     9/1994
(Continued)

OTHER PUBLICATIONS

Fenwick et al., "Transition metal- and rare earth-doped ZnO: a comparison of optical, magnetic, and structural behavior of bulk and thin films", International Society for Optics and Photonics, Zinc Oxide Materials and Devices II, 2007, pp. 64741Q-1-8, vol. 6474.
(Continued)

*Primary Examiner* — Alex A Rolland
(74) *Attorney, Agent, or Firm* — The Webb Law Firm

(57) ABSTRACT

A coated article includes a substrate and a coating over at least a portion of the substrate. The coating includes a first dielectric layer over at least a portion of the substrate; a first metallic layer over at least a portion of the first dielectric layer; a second dielectric layer over at least a portion of the first metallic layer; and an overcoat over at least a portion of the second dielectric layer. A light absorbing layer is between second dielectric layer and the overcoat or is part of the overcoat. The light absorbing layer includes Ge, $GeO_x$, Hf, $HfO_x$, $HfO_2$, $NbN_x$, $NbN_xO_y$, $Si_aAl_b$, $Si_aAl_bO_x$, $Si_aCo_b$, $Si_aCo_bO_x$, $Si_aCo_bCu_c$, $Si_aCo_bCu_cO_x$, $Si_aCr_b$, $Si_aCr_bO_x$, $Si_aNi_b$, $SiNiO_x$, $SiO_x$, $SnN_x$, $SnO_x$, $SnO_xN_y$, $TiN_x$, $Ti_aNb_bN_x$, $Ti_aNb_bO_x$, $Ti_aNb_bO_xN_y$, $TiO_xN_y$, $WO_x$, $WO_2$, ZnO:Co, ZnO:Fe, ZnO:Mn, ZnO:Ni, ZnO:V, ZnO:Cr, $Zn_aSn_b$, $Zn_aSn_bO_x$, or any combination thereof.

21 Claims, 10 Drawing Sheets

(56) References Cited

U.S. PATENT DOCUMENTS

| | | | |
|---|---|---|---|
| 4,466,562 A | 8/1984 | DeTorre | |
| 4,671,155 A | 6/1987 | Goldinger | |
| 5,088,258 A | 2/1992 | Schield et al. | |
| 5,106,663 A | 4/1992 | Box | |
| 8,500,965 B2 | 8/2013 | Thiel | |
| 2005/0123772 A1* | 6/2005 | Coustet | C03C 17/3626 428/432 |
| 2007/0281171 A1* | 12/2007 | Coster | C03C 17/3652 428/432 |
| 2011/0236715 A1 | 9/2011 | Polcyn et al. | |
| 2011/0300319 A1 | 12/2011 | Reymond et al. | |
| 2013/0220311 A1 | 8/2013 | Barkai et al. | |
| 2014/0072784 A1* | 3/2014 | Dietrich | C03C 17/3626 428/213 |
| 2014/0272453 A1* | 9/2014 | Polcyn | C03C 17/3689 428/622 |
| 2016/0031750 A1* | 2/2016 | Ridealgh | C03C 17/36 428/336 |
| 2016/0223729 A1* | 8/2016 | Medwick | C03C 17/3639 |
| 2016/0299259 A1 | 10/2016 | You et al. | |
| 2017/0341977 A1 | 11/2017 | Polcyn et al. | |
| 2018/0237336 A1 | 8/2018 | Boyce et al. | |

FOREIGN PATENT DOCUMENTS

| | | |
|---|---|---|
| JP | 2012513369 A | 6/2012 |
| JP | 2012204438 A | 10/2012 |
| JP | 201494448 A | 5/2014 |
| JP | 201766304 A | 4/2017 |
| WO | 2006124503 A2 | 11/2006 |

OTHER PUBLICATIONS

Gao et al., "Microstructure and optical properties of Fe-doped ZnO thin films prepared by DC magnetron sputtering", Journal of Crystal Growth, 2013, pp. 126-129, vol. 371.

Singh et al., "Optical and electrical resistivity studies of isolvalent and aliovalent 3d transition metal ion doped ZnO", Physical Review B, 2009, pp. 045210-1-10, vol. 80.

* cited by examiner

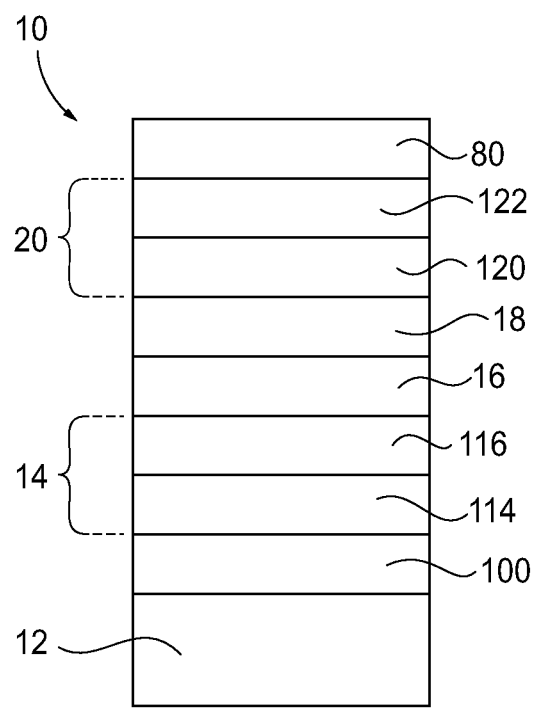
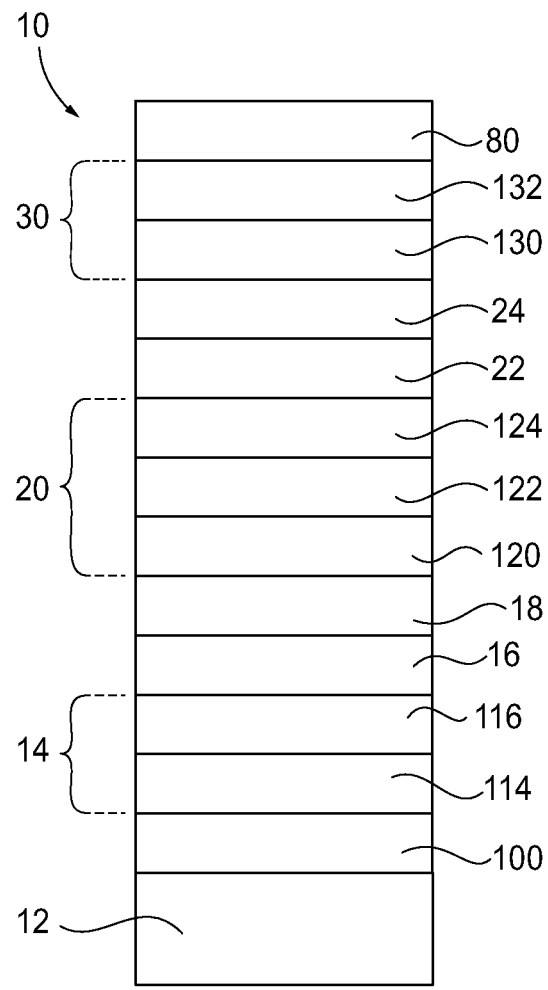
FIG. 1A
FIG. 1B

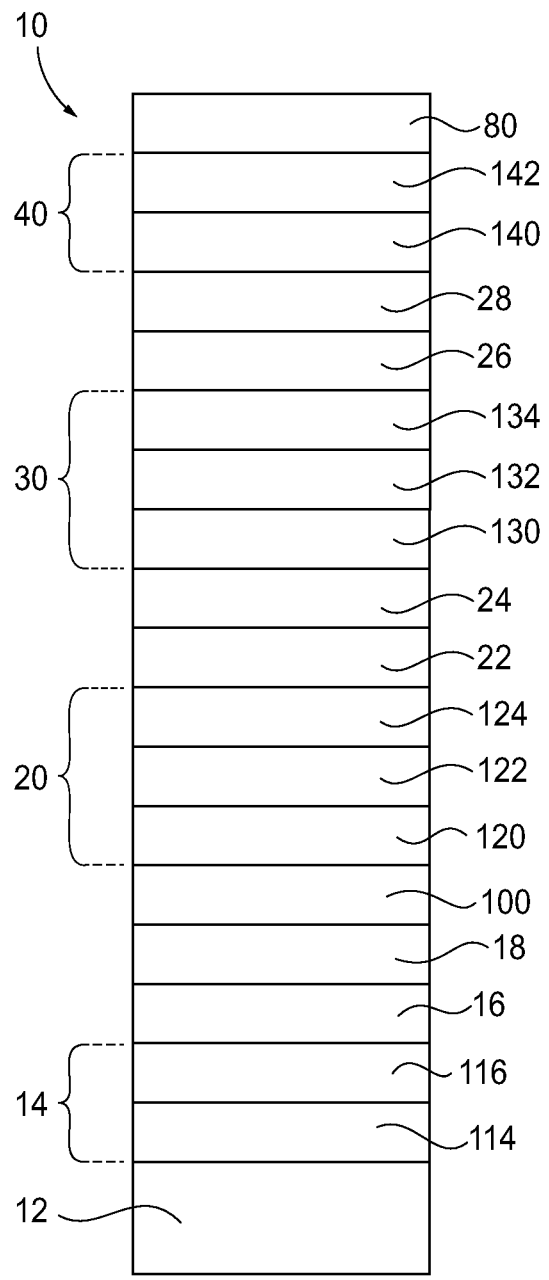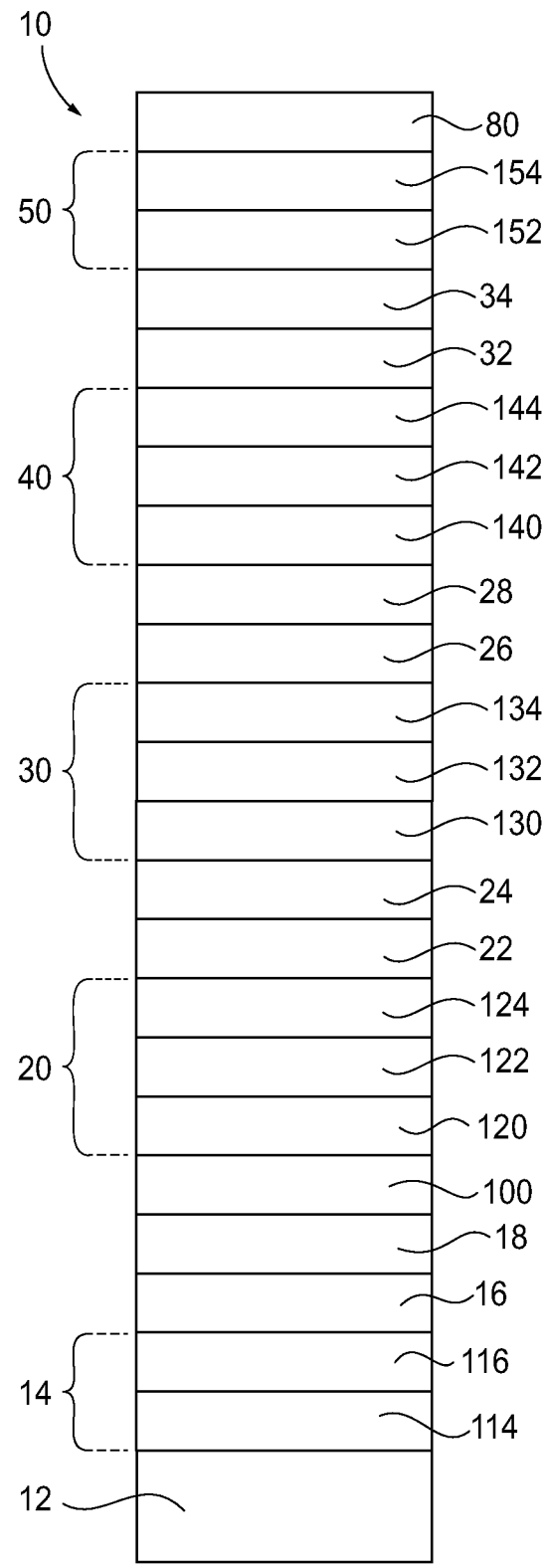
FIG. 2C  FIG. 2D

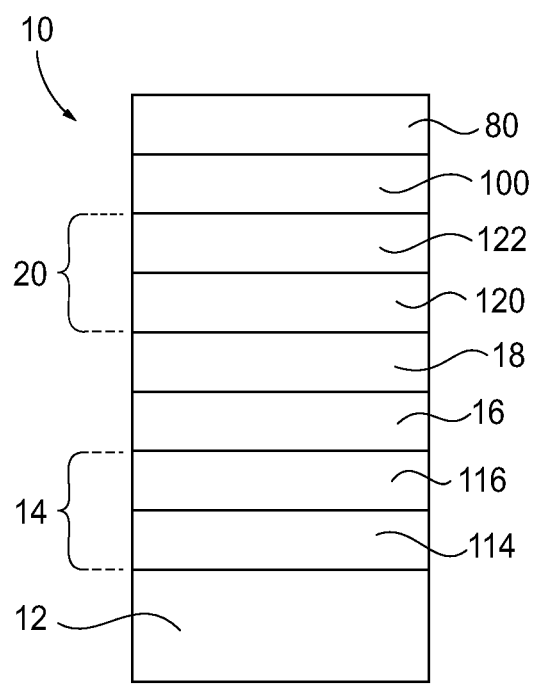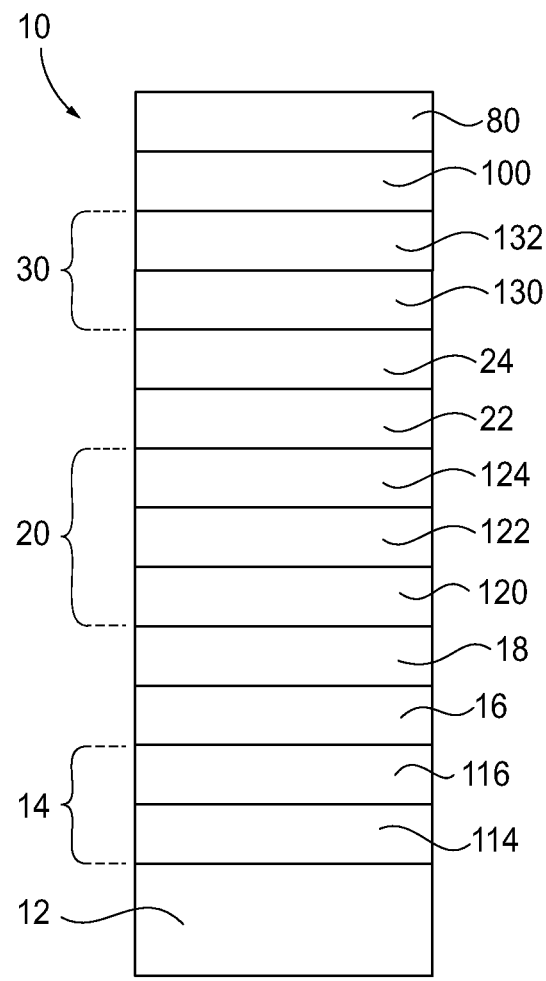
FIG. 5A  FIG. 5B

ARTICLES COATED WITH COATINGS CONTAINING LIGHT ABSORPTION MATERIALS

CROSS REFERENCE TO RELATED APPLICATION

The present application is entitled to and claims priority to U.S. Provisional Patent Application No. 62/735,632, filed on Sep. 24, 2018, the disclosure of which is incorporated herein by reference in its entirety.

FIELD OF THE INVENTION

The present invention relates to coated articles that contain light absorption materials and which can be used for absorbing and transmitting desired ranges of electromagnetic radiation.

BACKGROUND OF THE INVENTION

Substrates used in a variety of applications including architectural applications, automotive applications, consumer appliances, etc. are typically coated with a functional and/or aesthetic coating. For example, solar control coatings are commonly applied to transparent architectural and automotive substrates to reflect and/or absorb light. For example, solar control coatings are typically used to block or filter certain ranges of electromagnetic radiation to reduce the amount of solar energy entering a vehicle or building. This reduction of solar energy transmittance also helps reduce the energy load on the cooling units of the vehicle or building. It is therefore desirable to provide new coatings that block or filter certain ranges of electromagnetic radiation.

SUMMARY OF THE INVENTION

The present invention relates to a coated article comprising a substrate, a coating applied over at least a portion of the substrate, and a light absorbing layer. The coating includes a first dielectric layer over at least a portion of the substrate, a first metallic layer over at least a portion of the first dielectric layer, a second dielectric layer over at least a portion of the first metallic layer, and an overcoat over at least a portion of the second dielectric layer. A light absorbing layer is between the second dielectric layer and the overcoat and/or is part of the overcoat. The light absorbing layer comprises or can be selected from the group consisting of Ge, GeO$_x$, Hf, HfO$_x$, HfO$_2$, NbN$_x$, NbN$_x$O$_y$, Si$_a$Al$_b$, Si$_a$Al$_b$O$_x$, Si$_a$Co$_b$, Si$_a$Co$_b$O$_x$, Si$_a$Co$_b$Cu$_c$, Si$_a$Co$_b$Cu$_c$O$_x$, Si$_a$Cr$_b$, Si$_a$Cr$_b$O$_x$, Si$_a$Ni$_b$, SiNiO$_x$, SiO$_x$, SnN$_x$, SnO$_x$, SnO$_x$N$_y$, TiN$_x$, Ti$_a$Nb$_b$N$_x$, Ti$_a$Nb$_b$O$_x$, Ti$_a$Nb$_b$O$_x$N$_y$, TiO$_x$N$_y$, WO$_x$, WO$_2$, ZnO:Co, ZnO:Fe, ZnO:Mn, ZnO:Ni, ZnO:V, ZnO:Cr, Zn$_a$Sn$_b$, Zn$_a$Sn$_b$O$_x$, or any combination thereof.

The light absorbing material can be over the second dielectric layer, in between the second dielectric layer and the overcoat, beneath the overcoat, or can be part of the overcoat.

The coating can also include a second metallic layer over at least a portion of the second dielectric layer and a third dielectric layer over at least a portion of the second metallic layer. Further, the overcoat is over at least a portion of the third dielectric layer and the light absorbing layer is over the third dielectric layer, in between the overcoat and the third dielectric layer, beneath the overcoat, or can be a part of the overcoat.

The coated article can further include a third metallic layer over at least a portion of the third dielectric layer, and a fourth dielectric layer over at least a portion of the third metallic layer. The overcoat is over at least a portion of the fourth dielectric layer. The light absorbing layer is over the fourth dielectric layer, between the fourth dielectric layer and the overcoat, beneath the overcoat, or can be a part of the overcoat.

The coated article can further include a fourth metallic layer over at least a portion of the fourth dielectric layer, and a fifth dielectric layer over at least a portion of the fourth metallic layer. The overcoat is over at least a portion of the fifth dielectric layer. The light absorbing layer is over the fifth dielectric layer, between the fifth dielectric layer and the overcoat, beneath the overcoat, or can be a part of the overcoat.

The present invention also relates to a coated article that includes a glass substrate and a coating applied over at least a portion of the substrate in which the coating includes a first dielectric layer over at least a portion of the substrate; a first metallic layer over at least a portion of the first dielectric layer; a second dielectric layer over at least a portion of the first metallic layer; a second metallic layer over at least a portion of the second dielectric layer; a third dielectric layer over at least a portion of the second metallic layer; and an overcoat over at least a portion of the third dielectric layer. At least one of the metallic layers is a continuous metallic layer and at least one primer layer is formed over at least one of the metallic layers. A light absorbing layer is over the third dielectric layer, between the third dielectric layer and the overcoat, beneath the overcoat, or can be a part of the overcoat. Further, the light absorbing layer comprises or can be selected from the group consisting of Ge, GeO$_x$, Hf, HfO$_x$, HfO$_2$, NbN$_x$, NbN$_x$O$_y$, Si$_a$Al$_b$, Si$_a$Al$_b$O$_x$, Si$_a$Co$_b$, Si$_a$Co$_b$O$_x$, Si$_a$Co$_b$Cu$_c$, Si$_a$Co$_b$Cu$_c$O$_x$, Si$_a$Cr$_b$, Si$_a$Cr$_b$O$_x$, Si$_a$Ni$_b$, SiNiO$_x$, SiO$_x$, SnN$_x$, SnO$_x$, SnO$_x$N$_y$, TiN$_x$, Ti$_a$Nb$_b$N$_x$, Ti$_a$Nb$_b$O$_x$, Ti$_a$Nb$_b$O$_x$N$_y$, TiO$_x$N$_y$, WO$_x$, WO$_2$, ZnO:Co, ZnO:Fe, ZnO:Mn, ZnO:Ni, ZnO:V, ZnO:Cr, Zn$_a$Sn$_b$, Zn$_a$Sn$_b$O$_x$, or any combination thereof.

The coating can further include one or more additional metallic layers and one or more dielectric layers. Each additional metallic layer is formed over at least a portion of a previously formed dielectric layer and an additional dielectric layer is formed over each additional metallic layer. Further, the overcoat is formed over at least a portion of the uppermost dielectric layer and the light absorbing layer is formed over the uppermost dielectric layer, between the uppermost dielectric layer and the overcoat, beneath the overcoat, or can be a part of the overcoat.

BRIEF DESCRIPTION OF THE DRAWINGS

FIGS. 1A-1D: A side view (not to scale) diagram of a coated article incorporating features of the invention, wherein a light absorbing layer is positioned between the substrate and the first film of the first dielectric layer for a single metallic layer coating stack (FIG. 1A), a double metallic layer coating stack (FIG. 1B), a triple metallic layer coating (FIG. 1C), and a quadruple metallic layer coating (FIG. 1D).

FIGS. 2A-2D: A side view (not to scale) diagram of a coated article incorporating features of the invention, wherein a light absorbing layer is positioned between the first primer layer and the first film of the second dielectric layer for a single metallic layer coating stack (FIG. 2A), a double metallic layer coating stack (FIG. 2B), a triple metallic layer coating (FIG. 2C), and a quadruple metallic layer coating (FIG. 2D).

FIGS. 5A-5D: A side view (not to scale) diagram of a coated article incorporating features of the invention, wherein a light absorbing layer is positioned between the uppermost dielectric layer and the overcoat for a single metallic layer coating stack (FIG. 5A), a double metallic layer coating stack (FIG. 5B), a triple metallic layer coating (FIG. 5C), and a quadruple metallic layer coating (FIG. 5D).

DESCRIPTION OF THE INVENTION

Figure 1C:
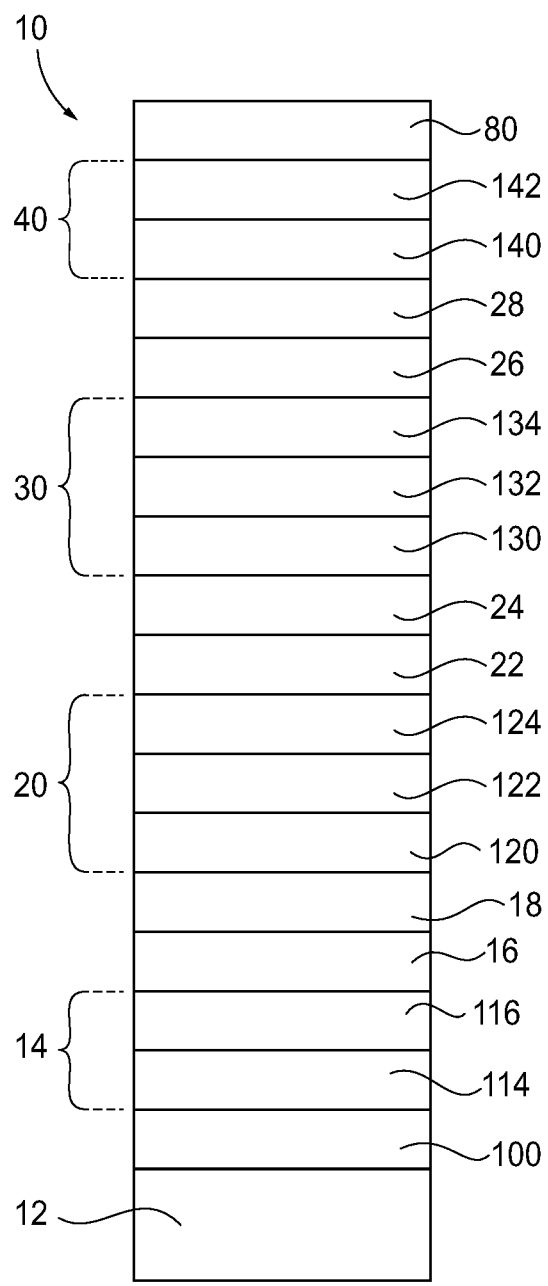
Figure 1D:
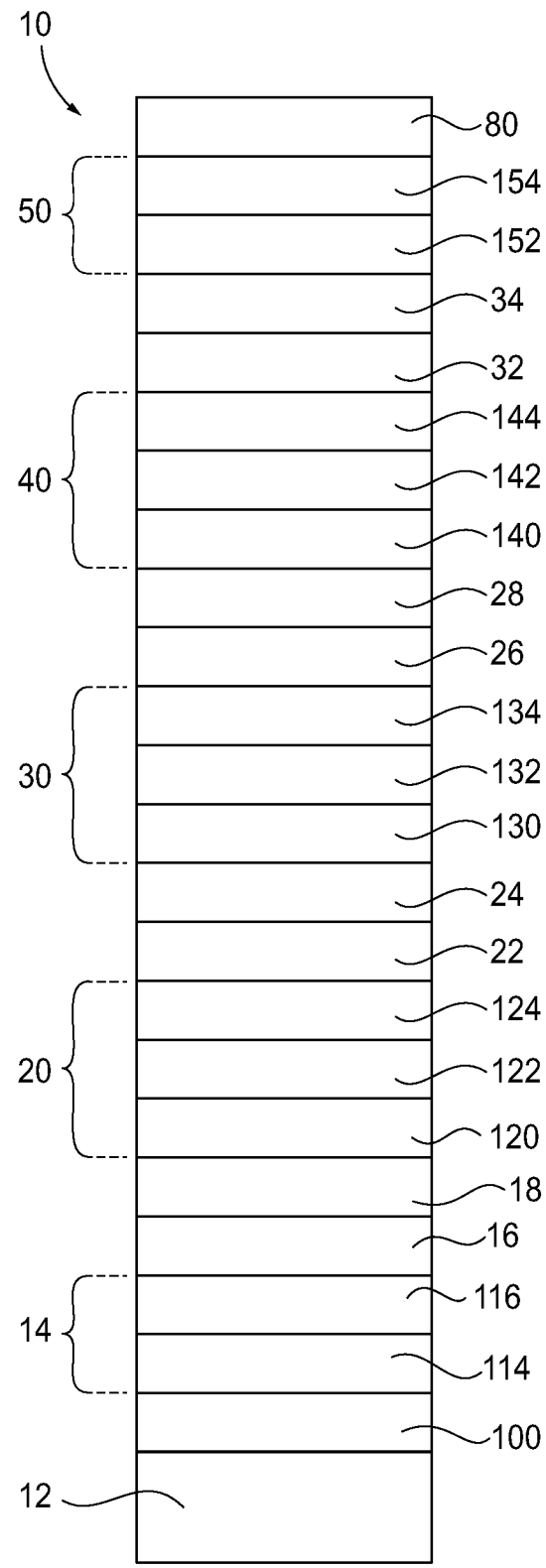
Figure 2A:
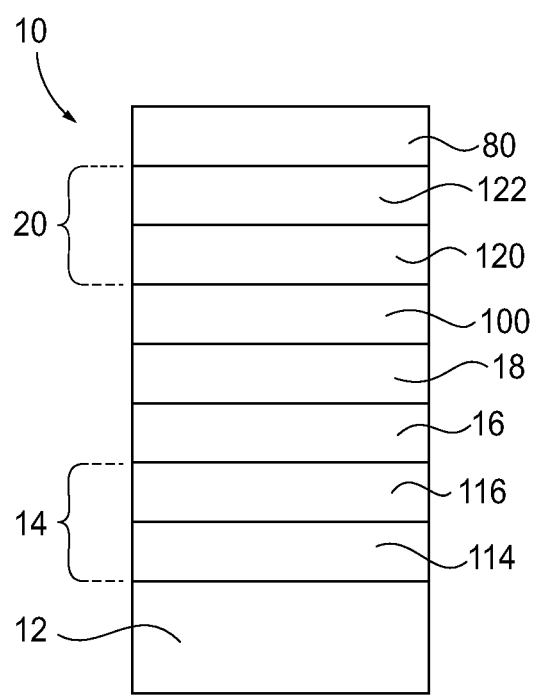
Figure 2B:
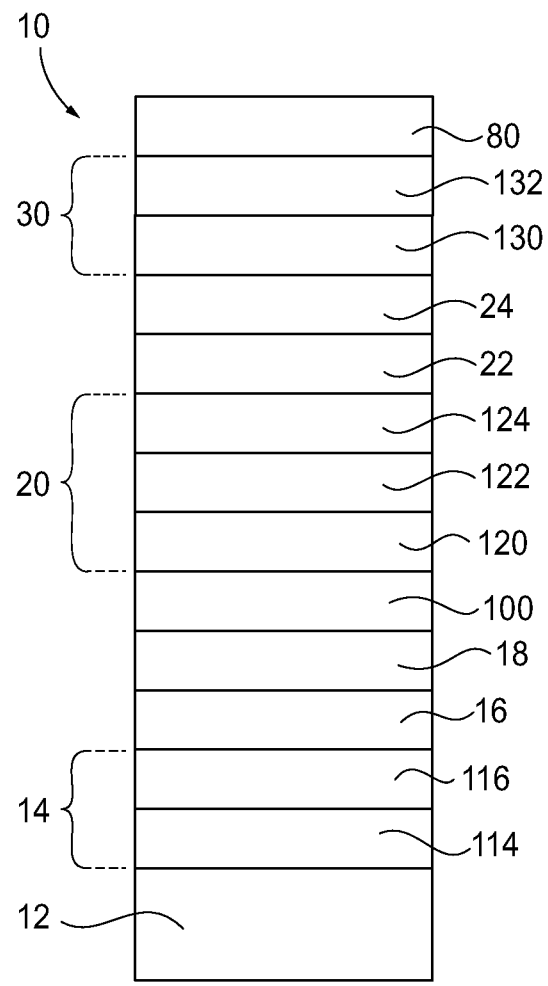
Figure 3A:
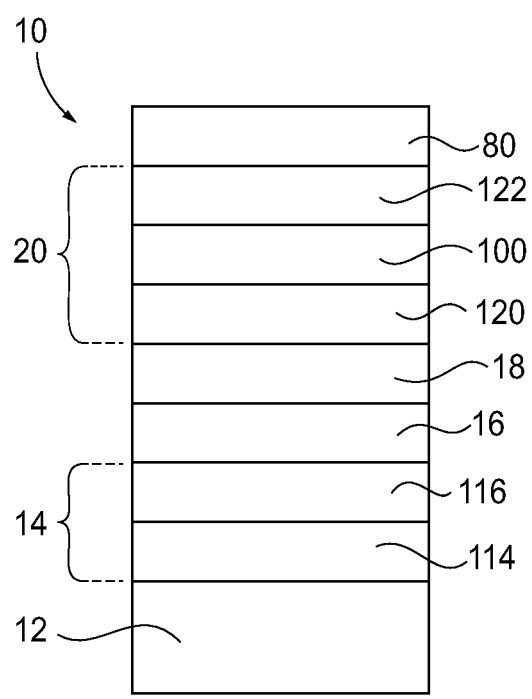
FIGS. 3A-3D: A side view (not to scale) diagram of a coated article incorporating features of the invention, wherein a light absorbing layer is positioned between the first film of the second dielectric layer and the second film of the second dielectric layer for a single metallic layer coating stack (FIG. 3A), a double metallic layer coating stack (FIG. 3B), a triple metallic layer coating (FIG. 3C), and a quadruple metallic layer coating (FIG. 3D).
Figure 3B:
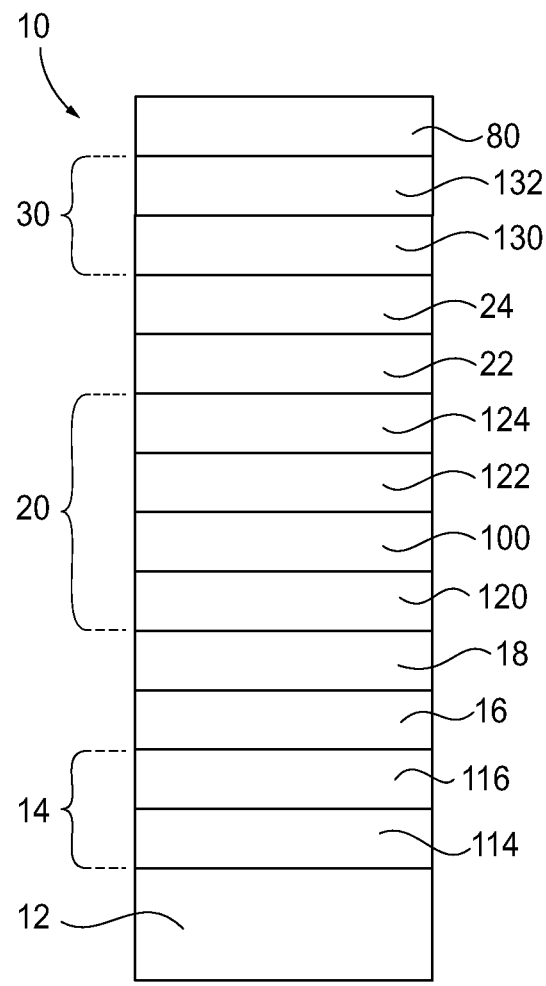
Figure 3C:
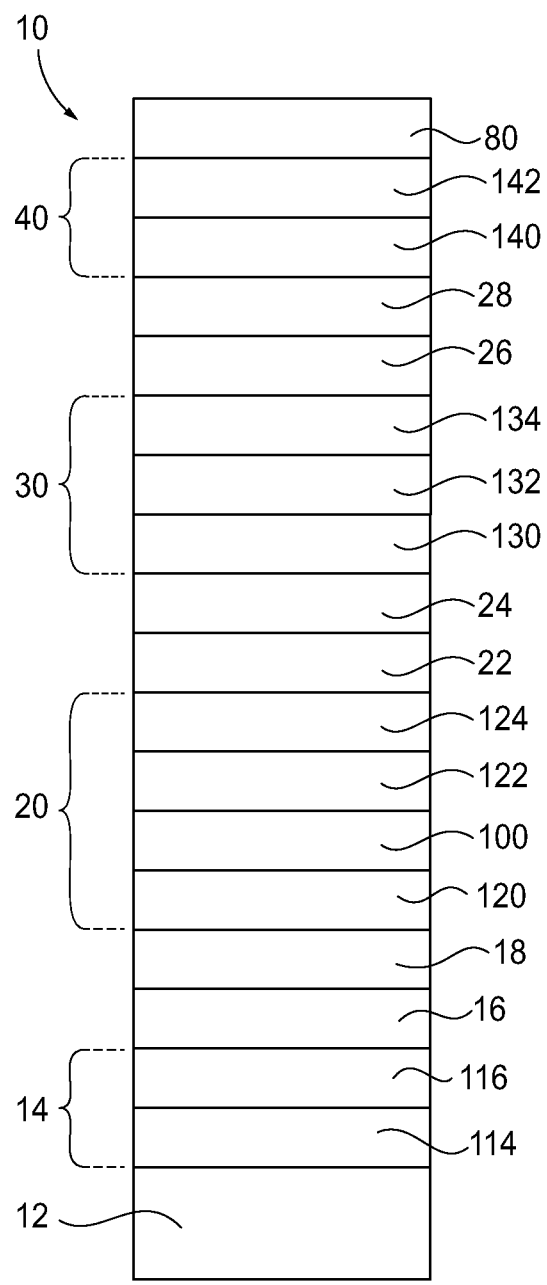
Figure 3D:
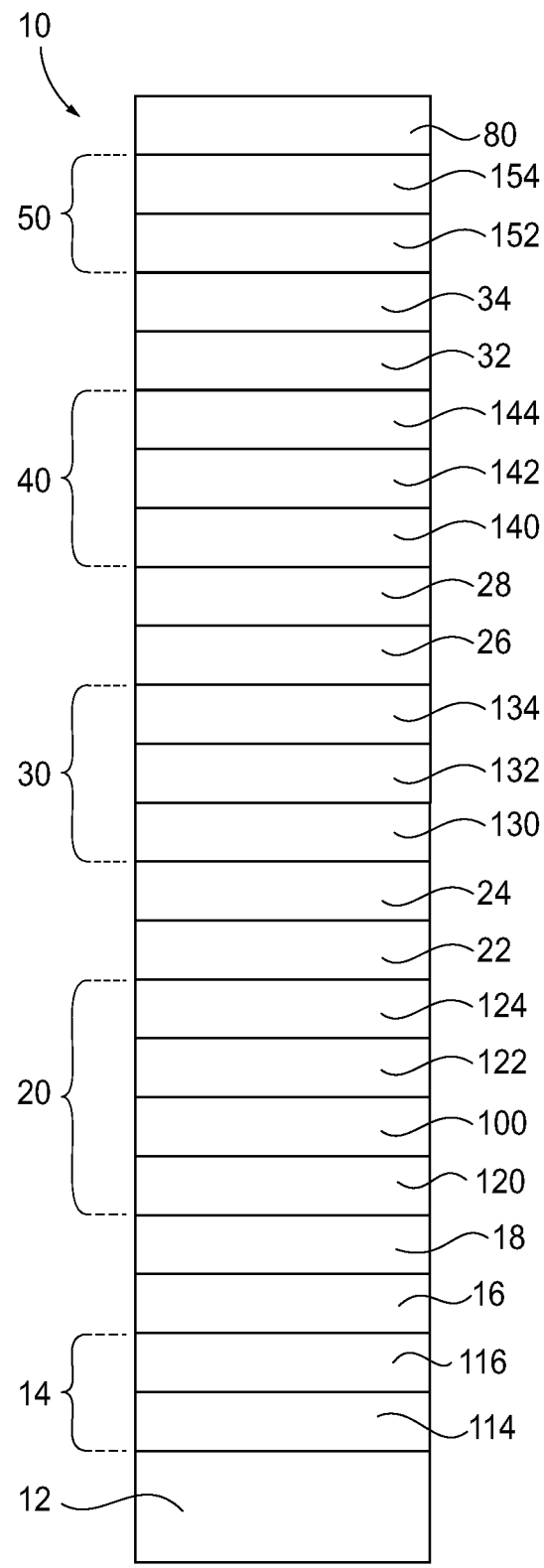

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate.

The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm.

The discussion of the invention may describe certain features as being "particularly" or "preferably" within certain limitations (e.g., "preferably", "more preferably", or "most preferably", within certain limitations). It is to be understood that the invention is not limited to these particular or preferred limitations but encompasses the entire scope of the disclosure.

As used herein, the term "film" refers to a coating region of a desired or selected coating composition. A "layer" can comprise one or more "films", and a "coating" or "coating stack" can comprise one or more "layers". The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands.

As indicated, the present invention relates to coated substrates. The coatings that are applied over the substrates can act as solar control coatings. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The solar control coating can block, absorb, or filter selected portions of the solar spectrum, such as, but not limited to, the IR, UV, and/or visible spectrums.

The coatings of the present invention are typically applied to substrates exhibiting a degree of transparency including, but not limited to, an insulating glass unit (IGU). It is appreciated that the coatings of the present invention can be practiced with various types of substrates. For example, the coatings of the present invention can be applied to laminated or non-laminated residential and/or commercial windows, insulating glass units, and/or transparencies for land, air, space, above water, and underwater vehicles. Other non-limiting examples of suitable substrates include metal substrates including, but not limited to, steel, galvanized steel, stainless steel, and aluminum; ceramic substrates; tile substrates; plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); or mixtures or combinations of any of the above.

As previously described, the substrate can include a transparent substrate. It is appreciated that while a typical transparent substrate can have sufficient visible light transmission such that materials can be viewed through the transparency, the transparency needs not be transparent to visible light but may be translucent or opaque. In addition, the transparency of the substrate can exhibit any desired visible light, infrared radiation, or ultraviolet radiation transmission and/or reflection. For example, the substrate can have a visible light transmission of any desired amount, e.g., greater than 0% and up to 100%.

In some examples, the substrate is a conventional insulating glass unit. Examples of such substrates are described in U.S. Application Publication No. 2011/0236715, which is incorporated by reference herein in its entirety. For instance, and as described in U.S. Application Publication No. 2011/0236715, the substrate is a conventional insulating glass unit that includes a first ply with a first major surface and an opposed second major surface. The substrate can also include a second ply having an outer (first) major surface and an inner (second) major surface and which is spaced from the first ply. The first and second plies can be connected together in any suitable manner, such as by being adhesively bonded to a conventional spacer frame. A gap or chamber is formed between the two plies. The chamber can be filled with a selected atmosphere, such as air, or a non-reactive gas such as argon or krypton gas. Non-limiting examples of insulating glass units are also described in U.S. Pat. Nos. 4,193,236; 4,464,874; 5,088,258; and 5,106,663, which are incorporated by reference herein in their entireties.

When an insulating glass unit is used, the plies can be of the same or different materials. For example, one or more of the plies can be transparent or translucent to visible light. As used herein, the term "translucent" refers to a substrate that allows electromagnetic energy (e.g., visible light) to pass through but which diffuses the energy such that objects on the side opposite are not clearly visible to the viewer. For example, one or more of the plies can include conventional soda-lime-silicate glass, borosilicate glass, or leaded glass. The glass can be clear glass such as non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. Further, as used herein, the term "float glass" refers to glass formed by a conventional float process in which molten glass is deposited onto a molten metal bath and controllably cooled to form a float glass ribbon. Examples of float glass processes are disclosed in U.S. Pat. Nos. 4,466,562 and 4,671,155, which are incorporated by reference herein in their entireties.

The coated articles 10 are described by FIGS. 1-5 (including sub-figures). The coating of the present invention that is deposited over at least a portion of the substrate 12 includes: a first dielectric layer 14 formed over at least a portion of the substrate 12; a first metallic layer 16 formed over at least a portion of the first dielectric layer 14; a second dielectric layer 20 formed over at least a portion of the first metallic layer 16; and an overcoat 80 formed over at least a portion of the second dielectric layer.

The first dielectric layer 14 can be a single layer or can comprise more than one film of antireflective materials and/or dielectric materials, such as, but not limited to, metal or metal alloy oxides, nitrides, oxynitrides, or mixtures thereof. The first dielectric layer 14 can also be transparent to visible light. Non-limiting examples of suitable metals for the first dielectric layer include titanium, hafnium, zirconium, niobium, zinc, bismuth, lead, indium, tin, silicon or mixtures thereof. These metal can be an oxide, nitride, or oxynitride. They can also have small amounts of other materials, such as manganese, indium, etc. In a non-limiting example, the first dielectric layer 14 can comprise oxides of metal alloys or metal mixtures, such as oxides containing zinc and tin (e.g., zinc stannate), oxides of indium-tin alloys, silicon nitrides, silicon aluminum nitrides, or aluminum nitrides.

Further, the first dielectric layer 14 (whether a single film or multiple film layer) can have a thickness in the range of 200 Å to 600 Å, preferably 250 Å to 550 Å, more preferably 300 Å to 500 Å, most preferably 375 Å to 425 Å.

As previously noted, the first dielectric layer 14 can comprise a multi-film structure. For example, the first dielectric layer can comprise a multi-film structure having a first film 114 deposited over at least a portion of the substrate and a second film 116 deposited over the first metal alloy oxide film. For example, the first film 114 may be zinc stannate, and the second film may be zinc oxide (e.g. zinc 90 wt. % and tin 10 wt. % oxide). A non-limiting example of a first dielectric layer 14 comprising a multi-film structure is described in U.S. Application Publication No. 2011/0236715 at paragraphs [0036] to [0039], which is incorporated by reference herein.

As indicated, the coating of the present invention can comprise a first metallic layer 16 deposited over the first dielectric layer 14. The first metallic layer 16 can include a reflective or non-reflective metal, such as, but not limited to, metallic gold, copper, palladium, aluminum, silver, or mixtures, alloys, or combinations thereof. In some examples, the first metallic layer 16 is a continuous layer. Alternatively, the first metallic layer 16 is a discontinuous layer. The first metallic layer 16 can have a thickness in the range of 50 Å to 150 Å, preferably 70 Å to 130 Å, more preferably 80 Å to 120 Å, most preferably 95 Å to 115 Å.

As used herein, a "continuous layer" refers to a coating layer that forms a continuous film of the material and which does not have isolated coating regions. In contrast, a "discontinuous layer" refers to a coating layer that forms a discontinuous film of the material and which does include isolated coating regions. It is appreciated that the metallic layers can be deposited below a critical thickness (also referred to as "subcritical layers") to form discontinuous regions or islands of the discontinuous layer rather than a continuous layer. These discontinuous layers absorb electromagnetic radiation through an effect known as surface Plasmon resonance. These subcritical layers typically have higher absorbance in the visible region than a continuous layer of the same material and also have lower solar energy reflectance.

A second dielectric layer 20 can also be deposited over the first metallic layer 16. The second dielectric layer 20 can comprise one or more metal or metal alloy containing films, such as those described above with respect to the first dielectric layer 14, with the first film of the second dielectric layer 120, the second film of the second dielectric layer 122, and the third film of the second dielectric layer 124. The second dielectric layer 20 can have a total thickness (e.g., the combined thicknesses of the layers) in the range of 600 Å to 1100 Å, preferably 700 Å to 1000 Å, more preferably 750 Å to 950 Å, most preferably 820 Å to 860 Å.

An overcoat 80 can be located over the second dielectric layer 20. The overcoat can help protect the underlying coating layers from mechanical and chemical attack. The overcoat 80 can be, for example, a metal oxide or metal nitride layer. For example, overcoat 80 can include silica, alumina, a mixture of silica and alumina, silicon nitride, silicon aluminum nitride, silicon aluminum oxynitride, titania, titanium aluminum oxide, zirconia, or mixture thereof. The overcoat 80 may have a total thickness in the range of 400 Å to 750 Å, preferably 450 Å to 700 Å, more preferably 500 Å to 675 Å, most preferably 520 Å to 650 Å. The overcoat may be contain into two or three protective films, and may additionally contain the light absorbing layer (80a and 80b).

In accordance with the present invention, a light absorbing layer 100 is over the second dielectric layer 20, between the second dielectric layer 20 and the overcoat 80, beneath the overcoat 80, or part of the overcoat 80. For instance, a light absorbing layer 100 can be deposited over the second dielectric layer 20 prior to depositing the overcoat 80. As used herein, a "light absorbing layer" refers to a layer that absorbs certain ranges of electromagnetic radiation to produce certain colors. For instance, the light absorbing layer 100 can have a lower absorption in the blue wavelength regions or neutral wavelength regions to produce blue and neutral colors.

The light absorbing layer 100 used with the present invention can include Ge, $GeO_x$, Hf, $HfO_x$, $HfO_2$, $NbN_x$, $NbN_xO_y$, $Si_aAl_b$, $Si_aAl_bO_x$, $Si_aCo_b$, $Si_aCo_bO_x$, $Si_aCo_bCu_c$, $Si_aCo_bCu_cO_x$, $Si_aCr_b$, $Si_aCr_bO_x$, $Si_aNi_b$, $SiNiO_x$, $SiO_x$, $SnN_x$, $SnO_x$, $SnO_xN_y$, $TiN_x$, $Ti_aNb_bN_x$, $Ti_aNb_bO_x$, $Ti_aNb_bO_xN_y$, $TiO_xN_y$, $WO_x$, $WO_2$, ZnO:Co, ZnO:Fe, ZnO:Mn, ZnO:Ni, ZnO:V, ZnO:Cr, $Zn_aSn_b$, $Zn_aSn_bO_x$, or any combination thereof.

As used herein, the term "suboxide" refers to a class of oxides in which the electropositive element (e.g., a metal element) is in excess as compared to normal oxides. An oxide or suboxide is formed by sputtering the metal or metal alloy in an oxygen ($O_2$) atmosphere that has a specific flow rate to form an atmosphere of greater than 0% $O_2$ to less than or equal to 80% $O_2$. The flow rate is an approximation to the amount of $O_2$ in the atmosphere, but that one of ordinary skill in the art would recognize that additional $O_2$ may leak into the coating chamber as the coating chamber is not hermetically sealed from the outside environment. For example, the $O_2$ flow rate (i.e. concentration of $O_2$ in the atmosphere for the chamber where the material is being deposited) can be in the range of 0% to 50%, such as 10% to 50%, such as 20% to 30%, such as 20% to 40%, such as 20% to 50%, such as 30% to 40%, such as 30% to 50%. Alternatively, the flow rate for $O_2$ can be 5% to 30%, such as 10% to 20%. The term "subnitride" refers to a class of nitrides in which the electropositive element (e.g., a metal element) is in excess as compared to normal nitrides. A nitride or subnitride is formed by sputtering the metal or metal alloy in a nitrogen ($N_2$) atmosphere that has a specific flow rate as to form an atmosphere of greater than 0% $N_2$ to less than or equal to 80% $N_2$. For example, the $N_2$ flow rate can be 0% to 50%, preferably 1% to 40%, more preferably 3% to 35%, most preferably 5% to 30%. Alternatively, the $N_2$ flow rate can be 5% to 80%. The flow rate is an approximation to the amount of $N_2$ in the atmosphere, but that one of ordinary skill in the art would recognize that additional $N_2$ may leak into the coating chamber as the coating chamber is not hermetically sealed from the outside environment. The remainder of the atmosphere in either case (oxygen or nitrogen atmosphere) can be an inert gas, such as argon.

Further, a "metal alloy" refers to a combination of a metal with a second material such as a second, different metal for example. The chemical structure of the light absorbing layer 100 is designated by weight percent of an element, a, b, and c. In some embodiments, b is equal to 1–a. In other embodiments, b may be less than 1–a. In some embodiments, c may be equal to 1–a–b. In other embodiments, c may be less than 1–a–b. The weight percentages of a, b and c indicated herein disregard the weight of oxygen or nitride. Instead, the resulting weight percent of oxide and/or nitride of the light absorbing compound is designated by x and/or y within the chemical structure, wherein x and y can have a weight percentage in the range of 0 wt. % to any number being a full oxide and/or nitride. Light absorbing layer 100 compositions can be found in Table 1.

The light absorbing layer 100 used with the present invention can be selected from a metal alloy, suboxide, or subnitride comprising silicon and one or more metals. The one or more metals can be selected from a metal of Groups 3 to 15 of the periodic table of the chemical of elements. For instance, the one or more metals can be selected from a transition metal or a post-transition metal.

Non-limiting examples of a metal alloy, suboxide, or subnitride comprising silicon and one or more metals include $Si_aAl_b$, $Si_aAl_bO_x$, $Si_aCo_b$, $Si_aCo_bO_x$, $Si_aCo_bCu_c$, $Si_aCo_bCu_cO_x$, $Si_aCr_b$, $Si_aCr_bO_x$, $Si_aNi_b$, $SiNiO_x$, $SiO_x$, or any combination thereof. For instance, the light absorbing layer 100 can comprise $Si_aCo_b$ in b is within a range of 12.5 wt. % to 79 wt. %. Other non-limiting examples include $Si_aNi_bO_x$ in which a is 39 wt. % to 46 wt. %, $Si_aCo_bO_x$ in which a is 43 wt. %, $Si_aCo_bCu_cO_x$ in which a is 19 wt. % or 14 wt. %, $Si_aCr_bO_x$ in which a is 48 wt. %, and $Si_aAl_b$ in which the wt. % of Si is 85 wt. %.

The light absorber component 100 can further be selected from a metal, metal alloy, suboxide, subnitride, or nitride comprising titanium. Non-limiting examples of such compounds include $TiN_x$, $Ti_aNb_bN_x$, $Ti_aNb_bO_x$, $Ti_aNb_bO_xN_y$, $TiO_xN_y$, or a combination thereof.

The light absorber component 100 can also be selected from a metal, metal alloy, suboxide, subnitride, or nitride comprising niobium. Non-limiting examples of such compounds include Nb, $NbN_x$, $NbN_xO_y$, $Ti_aNb_bN_x$, $Ti_aNb_bO_x$, $Ti_aNb_bO_xN_y$, $TiO_xN_y$, or a combination thereof.

The light absorbing layer 100 used with the present invention can include a suboxide or subnitride compound comprising tin. Non-limiting examples of such compounds include $SnN_x$, $SnO_x$, $SnO_xN_y$, $Zn_aSn_b$, $Zn_aSn_bO_x$, or a combination thereof. For instance, the light absorbing layer 100 can comprise $Zn_aSn_b$ or $Zn_aSn_bO_x$ in which the weight ratio of Zn to Sn includes, but is not limited to, 99-85:1-15, 95-85:5-15, about 90:10, about 85:15, 40-60:60-40, 45-55:55-45, or about 52:48.

As previously described, the light absorber component 100 can further be selected from ZnO:Co, ZnO:Fe, ZnO:Mn, ZnO:Ni, ZnO:V, ZnO:Cr, or a combination thereof.

The light absorbing layer 100 can further be selected from Ge, $GeO_x$, Hf, $HfO_x$, $WO_x$, $WO_2$, or combinations thereof.

The light absorbing layer can comprise a metal alloy, as described in Table 1, below. The metal alloys may be a metal alloy, a suboxide, a subnitride, a suboxynitride, an oxide, a nitride, or an oxynitride. The light absorbing layer 100 can comprise ZnO doped with additional materials, such as transition metals, as described in Table 2.

TABLE 1

Ratios of Metals for Metal Alloys Used as Light Absorbers

| Material | Range (wt. %) | Preferred Range (wt. %) | More Preferred Range (wt. %) | Most Preferred Range (wt. %) |
|---|---|---|---|---|
| $Si_aAl_b$, | a = 72 to 98 wt. % | a = 75 to 95 wt. % | a = 78 to 92 wt. % | a = 80 to 90 wt. % |
| | b = 2 to 28 wt. % | b = 5 to 25 wt. % | b = 8 to 22 wt. % | b = 10 to 20 wt. % |
| $Si_aCo_b$ | a = 20 to 60 wt. % | a = 25 to 55 wt. % | a = 28 to 52 wt. % | a = 30 to 50 wt. % |
| | b = 40 to 80 wt. % | b = 45 to 75 wt. % | b = 48 to 72 wt. % | b = 50 to 70 wt. % |
| $Si_aCr_b$ | a = 30 to 65 wt. % | a = 35 to 60 wt. % | a = 40 to 55 wt. % | a = 45 to 50 wt. % |
| | b = 35 to 70 wt. % | b = 40 to 65 wt. % | b = 45 to 60 wt. % | b = 50 to 55 wt. % |
| $Si_aCo_bCu_c$ | a = 5 to 40 wt. % | a = 5 to 35 wt. % | a = 5 to 30 wt. % | a = 12 to 22 wt. % |
| | b = 5 to 45 wt. % | b = 10 to 40 wt. % | b = 15 to 40 wt. % | b = 18 to 38 wt. % |
| | c = 15 to 90 wt. % | c = 25 to 85 wt. % | c = 30 to 80 wt. % | c = 40 to 70 wt. % |
| $Si_aNi_b$ | a = 25 to 60 wt. % | a = 30 to 55 wt. % | a = 35 to 50 wt. % | a = 38 to 50 wt. % |
| | b = 40 to 75 wt. % | b = 45 to 70 wt. % | b = 50 to 65 wt. % | b = 50 to 62 wt. % |
| $Ti_aNb_b$ | a = 0 to 100 wt. % | a = greater than 0 to 83 wt. % | a = greater than 0 to 83 wt. % | a = greater than 0 to 83 wt. % |
| | b = 100 to 0 wt. % | b = less than 100 to 17 wt. % | b = less than 100 to 17 wt. % | b = less than 100 to 17 wt. % |
| $Zn_aSn_b$ | a = 40 to 99 wt. % | a = 45 to 99 wt. % | a = 48 to 97 wt. % | a = 50 to 96 wt. % |
| | b = 1 to 60 wt. % | b = 1 to 55 wt. % | b = 3 to 52 wt. % | b = 4 to 50 wt. % |

TABLE 2

Ratios of Dopants for Materials Used as Light Absorbers

| Material | Range (wt. %) | Preferred Range (wt. %) | More Preferred Range (wt. %) | Most Preferred Range (wt. %) |
|---|---|---|---|---|
| ZnO: Co | Co: 0 to 40 wt. % | Co: 0 to 30 wt. % | Co: 0 to 20 wt. % | Co: 0 to 10 wt. % |
| ZnO: Fe | Fe: 0 to 40 wt. % | Fe: 0 to 30 wt. % | Fe: 0 to 20 wt. % | Fe: 0 to 10 wt. % |
| ZnO: Mn | Mn: 0 to 40 wt. % | Mn: 0 to 30 wt. % | Mn: 0 to 20 wt. % | Mn: 0 to 10 wt. % |
| ZnO: V | V: 0 to 40 wt. % | V: 0 to 30 wt. % | V: 0 to 20 wt. % | V: 0 to 10 wt. % |

It is appreciated that any of the previously described light absorbers can be deposited separately as a single light absorbing film or together in combination as multiple light absorbing films.

Further, the amount of oxygen or nitride of the suboxide and subnitride light absorbing layers 100 can be selected to adjust the color absorption. For instance, the amount of oxygen or nitrogen can be adjusted to produce a more neutral color.

The coatings of the present invention can further comprise additional coating layers. For instance, the coatings can comprise one or more additional metallic layers (subcritical or non-subcritical metallic layers) and one or more additional dielectric layers. For example, the coating can further include a second metallic layer 22 over at least a portion of the second dielectric layer 20. The second metallic layer 22 can have a thickness in the range of 50 Å to 120 Å, preferably 60 Å to 110 Å, more preferably 70 Å to 100 Å, most preferably 75 Å to 95 Å. A third dielectric layer 30 can be over at least a portion of the second metallic layer 22. The third dielectric layer 30 can comprise one or more metal oxide or metal alloy oxide-containing films, such as those described above with respect to the first dielectric layer 14, with a first film of the third dielectric layer 130 (e.g., a metal oxide or metal oxide mixture), a second film of the third dielectric layer 132 (e.g., a metal alloy oxide), and optionally a third film of the third dielectric layer 134 (e.g., a metal oxide or metal oxide mixture). The third dielectric layer 30 can have a total thickness (e.g., the combined thicknesses of the layers) in the range of 150 Å to 400 Å, preferably 200 Å to 350 Å, more preferably 230 Å to 300 Å, more preferably 260 Å to 280 Å. In such examples, the overcoat 80 is over at least a portion of the third dielectric layer 30 and the light absorbing layer 100 is over the third dielectric layer 30, between the third dielectric layer 30 and the overcoat 80, beneath the overcoat 80, or within the overcoat 80.

It is appreciated that the coating of the present invention can have multiple metallic and dielectric layers such as, for example, a third metallic layer 26 over at least a portion of the third dielectric layer 30 and a fourth dielectric layer 40 over at least a portion of the third metallic layer. The fourth dielectric layer 40 can comprise one or more metal oxide or metal alloy containing films, such as those described above with respect to the first dielectric layer 14, with a first film of the fourth dielectric layer 140 (e.g., a metal oxide or metal oxide mixture), a second film of the fourth dielectric layer 142 (e.g., a metal alloy oxide), and optionally a third film of the fourth dielectric layer 144 (e.g., a metal oxide or metal oxide mixture). The fourth dielectric layer can have a total thickness (e.g., the combined thicknesses of the layers) in the range of 450 Å to 800 Å, preferably 500 Å to 750 Å, most preferably 550 Å to 700 Å, more preferably 600 Å to 650 Å. The overcoat 80 will then be over at least a portion of the fourth dielectric layer 40 and the light absorbing layer 100 is over the fourth dielectric layer 40, between the fourth dielectric layer 40 and the overcoat 80, beneath the overcoat 80, or within the overcoat 80.

The coatings of the present invention can further comprise additional coating layers. For example, the coating can further include a fourth metallic layer 32 over at least a portion of the fourth dielectric layer 40. The fourth metallic layer 32 can have a total thickness in the range of 20 Å to 200 Å, preferably 40 Å to 150 Å, more preferably 60 Å to 110 Å, most preferably 70 Å to 100 Å. A fifth dielectric layer 50 can be over at least a portion of the fourth metallic layer 32. The fifth dielectric layer 50 can comprise one or more metal oxide or metal alloy containing films, such as those described with respect to the first dielectric layer 14, with a first film of the fifth dielectric layer 152 (e.g., a metal oxide or metal oxide mixture), a second film of the fifth dielectric layer 154, and optionally a third film of the fifth dielectric layer (e.g. a metal oxide or metal oxide mixture). The fifth dielectric layer 50 can have a total thickness in the range of 100 Å to 450 Å, preferably 150 Å to 400 Å, more preferably 200 Å to 350 Å, most preferably 230 Å to 280 Å. The overcoat 80 will then be over at least a portion of the fifth dielectric layer 50 and the light absorbing layer 100 is over the fifth dielectric layer 50, between the fifth dielectric layer 50 and the overcoat 80, beneath the overcoat 80, or within the overcoat 80.

As such, each additional metallic layer is over at least a portion of a previously formed dielectric layer and an additional dielectric layer is formed over each additional metallic layer. Further, when additional metallic and dielectric layers are used, the overcoat 80 is over at least a portion of the uppermost dielectric layer and the light absorbing layer 100 is formed over the uppermost dielectric layer, between the uppermost dielectric layer and the overcoat 80, beneath the overcoat 80, or within the overcoat 80.

The additional metallic and dielectric layers can be formed from any of the previously described materials used to form metallic and dielectric layers. For example, the additional dielectric layers can include one or more metal oxide or metal alloy oxide-containing films, such as discussed above with respect to the first and second dielectric layers 14, 20, and the additional metallic layers can include a reflective or non-reflective metal including metallic gold, copper, palladium, aluminum, silver, or mixtures, alloys, or combinations thereof, such as discussed above with respect to the first metallic layer 16. The additional layers can also include any of the previously described thicknesses.

It is to be understood that any of the metallic layers can be a continuous layer or a discontinuous layer in a coating stack when used. For example, for coating stacks having a plurality of metallic coating layers, more than one of the metallic layers could be a discontinuous subcritical metallic layer or a continuous metallic layer.

Other additional coating layers can be used with the present invention. For example, a primer layer 18, 24, 28, 34 can be over one or more, such as all, of the metallic layers. The primer layer 18, 24, 28, 34 can be a single film or a multiple film layer. The primer layer 18, 24, 28, 34 can include an oxygen-capturing material that can be sacrificial during the deposition process to prevent degradation or oxidation of the first reflective layer during the sputtering process or subsequent heating processes. The primer layer 18, 24, 28, 34 can also absorb at least a portion of electromagnetic radiation, such as visible light, passing through the coating. Non-limiting examples of materials suitable for the primer layer 18, 24, 28, 34 include titanium, silicon, silicon dioxide, silicon nitride, silicon oxynitride, nickel-chrome alloys (such as Inconel), zirconium, aluminum, alloys of silicon and aluminum, alloys containing cobalt and chromium (e.g., Stellite®), and/or mixtures thereof. For example, the primer layer 18, 24, 28, 34 can be titanium and can have a total thickness in the range of 1 Å to 60 Å, preferably 5 Å to 50 Å, more preferably 7 Å to 40 Å, most preferably 10 Å to 35 Å.

When a primer layer(s) is used with the present invention, a dielectric layer is formed over at least a portion of the primer layer. For example, a first primer layer 18 can be over the first metallic layer 16 and the second dielectric layer 20 can be formed over the first primer layer 18. A second primer layer 24 can be over the second metallic layer 22. A third primer layer can be over the third metallic layer 30. A fourth primer layer can be over the fourth metallic layer 32.

The coatings of the present invention can be deposited by any conventional method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition.

MSVD processes are typically performed in coaters having one or more coating zones. Each zone includes one or more targets for depositing a specific type of material on a substrate. Each target is placed in a bay which has its own gas feeds by which gas comes into the zone. Although gas comes into a zone in different places, all of the gas that comes into the zone leaves at a certain place in the zone. The gases used during the deposition process include reactive and/or non-reactive gasses. Non-limiting examples of reactive gases that are commonly used include hydrogen, oxygen, nitrogen, and combinations thereof. Moreover, non-limiting examples of non-reactive gases that are commonly used include one or more noble gases such as argon.

Each zone in a coater is run, i.e. operated to deposit a coating layer, in one of three modes-metal mode, transition mode, or oxide mode. It is appreciated that the amount of reactive gas that is capable of reacting with a target in the zone determines the mode. For instance, the transition mode can occur by increasing the reactive gas, such as oxygen, to a particular percentage range which can deposit substantially metal oxides and/or sub-oxides.

Further, MSVD methods can use one or more zones that are each independently run in one or more modes. For example, a MSVD method can comprise multiple zones that are each independently run in a single mode such as metal mode. Alternatively, the MSVD method can comprise one or more zones in which at least one of zones is run using multiple modes such as metal mode and transition or oxide mode. Examples of MSVD methods that use multiple modes in at least one zone are described in U.S. Pat. No. 8,500,965, which is incorporated by reference herein in its entirety.

It was found that the coatings of the present invention, which include the light absorbing layers 100 previously described herein, reduce the amount of solar energy entering vehicles or buildings through transparent substrate while also exhibiting blue and neutral colors (i.e., absorbing only low amounts of radiation in the blue and neutral color range). The coatings are also heat stable without sacrificing their thermal properties. Further, the coatings of the present invention exhibit little or no haze and can be applied at room temperature without having to apply heat.

The present invention is also directed to the following clauses.

Clause 1: A coated article comprising: a substrate; and a coating applied over at least a portion of the substrate, the coating comprising: a first dielectric layer over at least a portion of the substrate; a first metallic layer over at least a portion of the first dielectric layer; a second dielectric layer over at least a portion of the first metallic layer; and an overcoat over at least a portion of the second dielectric layer, a light absorbing layer is positioned between the second dielectric layer and the overcoat or the overcoat comprises the light absorbing layer, wherein the light absorbing layer comprises or may be selected from the group consisting of Ge, GeO$_x$, Hf, HfO$_x$, HfO$_2$, NbN$_x$, NbN$_x$O$_y$, Si$_a$Al$_b$, Si$_a$Al$_b$O$_x$, Si$_a$Co$_b$, Si$_a$Co$_b$O$_x$, Si$_a$Co$_b$Cu$_c$, Si$_a$CO$_b$Cu$_c$O$_x$, Si$_a$Cr$_b$, Si$_a$Cr$_b$O$_x$, Si$_a$Ni$_b$, SiNiO$_x$, SiO$_x$, SnN$_x$, SnO$_x$, SnO$_x$N$_y$, TiN$_x$, Ti$_a$Nb$_b$N$_x$, Ti$_a$Nb$_b$O$_x$, Ti$_a$Nb$_b$O$_x$N$_y$, TiO$_x$N$_y$, WO$_x$, WO$_2$, ZnO:Co, ZnO:Fe, ZnO:Mn, ZnO:Ni, ZnO:V, ZnO:Cr, Zn$_a$Sn$_b$, Zn$_a$Sn$_b$O$_x$, or any combination thereof.

Clause 2: The coated article of clause 1, wherein the light absorbing layer comprises or may be selected from the group consisting of Si$_a$Al$_b$, Si$_a$Al$_b$O$_x$, Si$_a$Co$_b$, Si$_a$Co$_b$O$_x$, Si$_a$Co$_b$Cu$_c$, Si$_a$Co$_b$Cu$_c$O$_x$, Si$_a$Cr$_b$, Si$_a$Cr$_b$O$_x$, Si$_a$Ni$_b$, SiNiO$_x$, SiO$_x$, or any combination thereof.

Clause 3: The coated article of clause 1, wherein the light absorbing layer comprises or may be selected from the group consisting of TiN$_x$, Ti$_a$Nb$_b$N$_x$, Ti$_a$Nb$_b$O$_x$, Ti$_a$Nb$_b$O$_x$N$_y$, TiO$_x$N$_y$, or any combination thereof, optionally wherein X (in relation to O) is greater than 0% to 50%, preferably 5% to 40%, more preferably 10% to 35%, most preferably 20% to 30%.

Clause 4: The coated article of clause 1, wherein the light absorbing layer comprises or may be selected from the group consisting of NbN$_x$, NbO$_x$N$_y$, Ti$_a$Nb$_b$N$_x$, Ti$_a$Nb$_b$O$_x$, Ti$_a$Nb$_b$O$_x$N$_y$, or any combination thereof Clause 5: The coated article of clause 1, wherein the light absorbing layer comprises or may be selected from the group consisting of SnN$_x$, SnO$_x$, Zn$_a$Sn$_b$, Zn$_a$Sn$_b$O$_x$, or any combination thereof.

Clause 6: The coated article of clause 1, wherein the light absorbing layer comprises or may be selected from the group consisting of ZnO:Co, ZnO:Fe, ZnO:Mn, ZnO:Ni, ZnO:V, ZnO:Cr, or a combination thereof.

Clause 7: The coated article of clause 1, wherein the light absorbing layer comprises or may be selected from the group consisting of Ge, GeO$_x$, Hf, HfO$_x$, WO$_x$, WO$_2$, or any combination thereof.

Clause 8: The coated article of clause 1, wherein the light absorbing layer comprises Si$_a$Co$_b$O$_x$, wherein a is in the range of 30 wt. % to 50 wt. %.

Clause 9: The coated article of clause 1, wherein the light absorbing layer comprises Si$_a$Co$_b$O$_x$ and wherein x is a resulting oxygen content when the light absorbing material is formed under an atmosphere having 20% to 40% of oxygen.

Clause 10: The coated article of any of the clauses 1 to 9, wherein at least one of the dielectric layers comprises at least one of a zinc stannate layer, a zinc oxide layer, a silicon nitride layer, a silicon aluminum nitride layer, an aluminum nitride layer, or mixtures thereof.

Clause 11: The coated article of any of the clauses 1 to 9, wherein the first dielectric layer comprises zinc stannate, and zinc oxide over at least a portion of the zinc stannate.

Clause 12: The coated article of any of the clauses 1 to 11, wherein the first dielectric layer comprises a total thickness in the range of 200 Å to 600 Å.

Clause 13: The coated article of any of the clauses 1 to 12, wherein the second dielectric layer comprises zinc oxide, zinc stannate over at least a portion of the zinc oxide, and zinc oxide over at least a portion of the zinc stannate.

Clause 14: The coated article of any of the clauses 1 to 13, wherein the second dielectric layer comprises a total thickness in the range of 600 Å to 1100 Å.

Clause 15: The coated article of any of the clauses 1 to 14 further comprises a second metallic layer over at least a portion of the second dielectric layer, and a third dielectric layer over at least a portion of the second metallic layer, wherein the light absorbing layer is positioned between the third dielectric layer and the overcoat, or the overcoat comprises the light absorbing layer.

Clause 16: The coated article of clause 15 further comprising a third metallic over at least a portion of the third dielectric layer, and a fourth dielectric layer over at least a portion of the third metallic layer, wherein the light absorbing layer is positioned between the fourth dielectric layer and the overcoat, or the overcoat comprises the light absorbing layer.

Clause 17: The coated article of clause 16 further comprises a fourth metallic layer over at least a portion of the fourth dielectric layer, and a fifth dielectric layer over at least a portion of the fourth metallic layer, wherein the light absorbing layer is positioned between the fifth dielectric layer and the overcoat, or the overcoat comprises the light absorbing layer.

Clause 18: The coated article of any of clauses 1 to 17, wherein the overcoat comprises silica, alumina, or mixtures thereof.

Clause 19: The coated article of any of the clauses 1 to 18, wherein the overcoat comprises silicon aluminum oxide.

Clause 20: The coated article of clauses 1 to 19, wherein the overcoat comprises a total thickness in the range of 400 Å to 750 Å.

Clause 21: The coated article of any of clauses 1 to 20, wherein the light absorbing layer is positioned between the second dielectric layer and the overcoat.

Clause 22: The coated article of any of clauses 1 to 21, wherein the light absorbing layer is positioned within the overcoat.

Clause 23: The coated article of any of the clauses 1 to 22, further comprising one or more additional metallic layers and one or more dielectric layers, wherein each additional metallic layer is over at least a portion of a previously formed dielectric layer and an additional dielectric layer is over each additional metallic layer, and wherein the overcoat is over at least a portion of the uppermost dielectric layer, and the light absorbing layer is positioned between the uppermost dielectric layer and the overcoat or positioned within the overcoat.

Clause 24: The coated article of any of clauses 1 to 23, where at least one of the metallic layers comprises at least one of gold, copper, palladium, aluminum, silver, mixtures thereof, alloys thereof, or combinations thereof.

Clause 25: The coated article of any of clauses 1 to 24, wherein at least one of the metallic layers is silver.

Clause 26: The coated article of any of clauses 1 or 25, wherein at least one of the metallic layers is a continuous metallic layer.

Clause 27: The coated article of any of clauses 1 or 26, wherein at least one of the metallic layers is a discontinuous metallic layer.

Clause 28: The coated article of any of clauses 1 to 27 wherein the first metallic layer comprises a total thickness in the range of 50 Å to 150 Å.

Clause 29: The coated article of any of clauses 1 to 28, wherein the second metallic layer comprises a total thickness in the range of 50 Å to 120 Å.

Clause 30: The coated article of any of clauses 1 to 29, further comprising at least one primer layer formed over at least one of the metallic layers.

Clause 31: The coated article of clause 30, wherein at least one of the primer layers is selected from the group consisting of titanium, silicon, silicon dioxide, silicon nitride, silicon oxynitride, nickel-chrome alloys, zirconium, aluminum, alloys of silicon and aluminum, alloys containing cobalt and chromium, or mixtures thereof.

Clause 32: The coated article of clause 30 or 31, wherein the primer layer comprise a total thickness in the range of 20 Å to 40 Å.

Clause 33: The coated article of any of the clauses 16 to 32, wherein the third dielectric layer comprises zinc oxide, and zinc stannate over at least a portion of the zinc oxide.

Clause 34: The coated article of any of the clauses 16 to 33, wherein the third dielectric layer comprises a total thickness in the range of 150 Å to 300 Å.

Clause 35: The coated article of any of clauses 1 to 34, wherein the substrate is glass.

Clause 36: The coated article of any of the clauses 1 to 35 further comprising a primer over each metallic layer.

Clause 37: A coated article comprising: a glass substrate; and a coating applied over at least a portion of the glass substrate, the coating comprising: a first dielectric layer over at least a portion of the substrate; a first metallic layer over at least a portion of the first dielectric layer; a second dielectric layer over at least a portion of the first metallic layer; a second metallic layer over at least a portion of the second dielectric layer; a third dielectric layer over at least a portion of the second metallic layer; an overcoat over at least a portion of the third dielectric layer, wherein at least one of the metallic layers is a continuous metallic layer and at least one primer layer is over at least one of the metallic layers, a light absorbing layer positioned between the third dielectric layer and the overcoat or the overcoat comprises the light absorbing layer, wherein the light absorbing layer comprises Ge, $GeO_x$, Hf, $HfO_x$, $HfO_2$, $NbN_x$, $NbN_xO_y$, $Si_aAl_b$, $Si_aAl_bO_x$, $Si_aCo_b$, $Si_aCo_bO_x$, $Si_aCo_bCu_c$, $Si_aCo_bCu_cO_x$, $Si_aCr_b$, $Si_aCr_bO_x$, $Si_aNi_b$, $SiNiO_x$, $SiO_x$, $SnN_x$, $SnO_x$, $SnO_xN_y$, $TiN_x$, $Ti_aNb_bN_x$, $Ti_aNb_bN_x$, $Ti_aNb_bO_xN_y$, $TiO_xN_y$, $WO_x$, $WO_2$, ZnO:Co, ZnO:Fe, ZnO:Mn, ZnO:Ni, ZnO:V, ZnO:Cr, $Zn_aSn_b$, $Zn_aSn_bO_x$, or any combination thereof.

Clause 38: The coated article of clause 37, wherein the light absorbing layer is positioned between the third dielectric layer and the overcoat.

Clause 39: The coated article of clause 37, wherein the overcoat comprises the light absorbing layer.

Clause 40: The coated article of any of the clauses 1 to 39, further comprising one or more additional metallic layers and one or more dielectric layers, wherein each additional metallic layer is over at least a portion of a previously formed dielectric layer and an additional dielectric layer is over each additional metallic layer, and wherein the overcoat is over at least a portion of the uppermost dielectric layer and the light absorbing layer is positioned between the uppermost dielectric layer and the overcoat or positioned within the overcoat.

Clause 41: A method of making a coated article providing a substrate and applying a coating over at least a portion of the substrate, wherein the coating comprises: providing a substrate; applying a coating over at least a portion of the substrate, wherein the applying step comprises: forming a first dielectric layer over at least a portion of the substrate; forming a first metallic layer over at least a portion of the first dielectric layer; forming a second dielectric layer over at least a portion of the first metallic layer; forming an overcoat over at least a portion of the second dielectric layer; forming a light absorbing layer between the second dielectric layer, or forming a light absorbing layer within the overcoat, wherein the light absorbing layer comprises Ge, $GeO_x$, Hf, $HfO_x$, $HfO_2$, $NbN_x$, $NbN_xO_y$, $Si_aAl_b$, $Si_aAl_bO_x$, $Si_aCo_b$, $Si_aCo_bO_x$, $Si_aCo_bCu_c$, $Si_aCo_bCu_cO_x$, $Si_aCr_b$, $Si_aCr_bO_x$, $Si_aNi_b$, $SiNiO_x$, $SiO_x$, $SnN_x$, $SnO_x$, $SnO_xN_y$, $TiN_x$, $Ti_aNb_bN_x$, $Ti_aNb_bO_x$, $Ti_aNb_bO_xN_y$, $TiO_xN_y$, $WO_x$, $WO_2$, ZnO:Co, ZnO:Fe, ZnO:Mn, ZnO:Ni, ZnO:V, ZnO:Cr, $Zn_aSn_b$, $Zn_aSn_bO_x$, Clause 42: The method according to clause 41, further comprising forming a primer over at least a portion of the first metallic.

Clause 43: The method according to any of the clauses 41 to 42, wherein the light absorbing layer comprises or may be selected from the group consisting of $Si_aAl_b$, $Si_aAl_bO_x$, $Si_aCo_b$, $Si_aCo_bO_x$, $Si_aCo_bCu_c$, $Si_aCo_bCu_cO_x$, $Si_aCr_b$, $Si_aCr_bO_x$, $Si_aNi_b$, $SiNiO_x$, $SiO_x$, or any combination thereof.

Clause 44: The method according to any of the clauses 41 to 42, wherein the light absorbing layer comprises or may be selected from the group consisting of $TiN_x$, $Ti_aNb_bN_x$, $Ti_aNb_bO_x$, $Ti_aNb_bO_xN_y$, $TiO_xN_y$, or any combination thereof, optionally wherein X (in relation to O) is greater than 0% to 50%, preferably 5% to 40%, more preferably 10% to 35%, most preferably 20% to 30%.

Clause 45: The method according to any of the clauses 41 to 42, wherein the light absorbing layer comprises or may be selected from the group consisting of $NbN_x$, $NbO_xN_y$, $Ti_aNb_bN_x$, $Ti_aNb_bO_x$, $Ti_aNb_bO_xN_y$, or any combination thereof.

Clause 46: The method according to any of the clauses 41 to 42, wherein the light absorbing layer comprises or may be selected from the group consisting of $SnN_x$, $SnO_x$, $Zn_aSn_b$, $Zn_aSn_bO_x$, or any combination thereof.

Clause 47: The method according to any of the clauses 41 to 42, wherein the light absorbing layer comprises or may be selected from the group consisting of ZnO:Co, ZnO:Fe, ZnO:Mn, ZnO:Ni, ZnO:V, ZnO:Cr, or a combination thereof.

Clause 48: The method according to any of the clauses 41 to 42, wherein the light absorbing layer comprises or may be selected from the group consisting of Ge, $GeO_x$, Hf, $HfO_x$, $WO_x$, $WO_2$, or any combination thereof.

Clause 49: The method according to any of the clauses 41 to 42, wherein the light absorbing layer comprises $Si_aCo_bO_x$, wherein a is in the range of 30 wt. % to 50 wt. %.

Clause 50: The method according to any of the clauses 41 to 42, wherein the light absorbing layer comprises $Si_aCo_bO_x$ and wherein x is a resulting oxygen content when the light absorbing material is formed under an atmosphere having 20% to 40% of oxygen.

Clause 51: The method according to any of the clauses 41 to 50, wherein at least one of the dielectric layers comprises at least one of a zinc stannate layer, a zinc oxide layer, a silicon nitride layer, a silicon aluminum nitride layer, an aluminum nitride layer, or mixtures thereof.

Clause 52: The method according to any of the clauses 41 to 51, wherein the first dielectric layer comprises zinc stannate, and zinc oxide over at least a portion of the zinc stannate.

Clause 53: The method according to any of the clauses 41 to 52, wherein the first dielectric layer comprises a total thickness in the range of 200 Å to 600 Å.

Clause 54: The method according to any of the clauses 41 to 53, wherein the second dielectric layer comprises zinc oxide, zinc stannate over at least a portion of the zinc oxide, and zinc oxide over at least a portion of the zinc stannate.

Clause 55: The method according to any of the clauses 41 to 54, wherein the second dielectric layer comprises a total thickness in the range of 600 Å to 1100 Å.

Clause 56: The method according to any of the clauses 41 to 55 further comprising forming a second metallic layer over at least a portion of the second dielectric layer, and forming a third dielectric layer over at least a portion of the second metallic layer, wherein the light absorbing layer is positioned between the third dielectric layer and the overcoat, or the overcoat comprises the light absorbing layer.

Clause 57: The method according to any of the clauses 41 to 56 further comprising forming a third metallic over at least a portion of the third dielectric layer, and forming a fourth dielectric layer over at least a portion of the third metallic layer, wherein the light absorbing layer is positioned between the fourth dielectric layer and the overcoat, or the overcoat comprises the light absorbing layer.

Clause 58: The method according to clauses 57 further comprising forming a fourth metallic layer over at least a portion of the fourth dielectric layer, and a fifth dielectric layer over at least a portion of the fourth metallic layer, wherein the light absorbing layer is positioned between the fifth dielectric layer and the overcoat, or the overcoat comprises the light absorbing layer.

Clause 59: The method according to any of the clauses 41 to 58, wherein the overcoat comprises silica, alumina, or mixtures thereof.

Clause 60: The method according to any of the clauses 41 to 58, wherein the overcoat comprises silicon aluminum oxide.

Clause 61: The method according to any of the clauses 41 to 60, wherein the overcoat comprises a total thickness in the range of 400 Å to 750 Å.

Clause 62: The method according to any of the clauses 41 to 61, wherein the light absorbing layer is positioned between the second dielectric layer and the overcoat.

Clause 63: The method according to any of the clauses 41 to 61, wherein the light absorbing layer is positioned within the overcoat.

Clause 64: The method according to any of the clauses 41 to 42 further comprising forming one or more additional metallic layers and one or more dielectric layers, wherein each additional metallic layer is over at least a portion of a previously formed dielectric layer and an additional dielectric layer is over each additional metallic layer, and wherein the overcoat is over at least a portion of the uppermost dielectric layer, and the light absorbing layer is positioned between the uppermost dielectric layer and the overcoat or positioned within the overcoat.

Clause 65: The method according to any of the clauses 41 to 64, wherein at least one of the metallic layers comprises at least one of gold, copper, palladium, aluminum, silver, mixtures thereof, alloys thereof, or combinations thereof.

Clause 66: The method according to any of the clauses 41 to 65, wherein at least one of the metallic layers is silver.

Clause 67: The method according to any of the clauses 41 to 66, wherein at least one of the metallic layers is a continuous metallic layer.

Clause 68: The method according to any of the clauses 41 to 67, wherein at least one of the metallic layers is a discontinuous metallic layer.

Clause 69: The method according to any of the clauses 41 to 68 wherein the first metallic layer comprises a total thickness in the range of 50 Å to 150 Å.

Clause 70: The method according to any of the clauses 41 to 69, wherein the second metallic layer comprises a total thickness in the range of 50 Å to 120 Å.

Clause 71: The method according to any of the clauses 41 to 70, wherein at least one of the primer layers is selected from the group consisting of titanium, silicon, silicon dioxide, silicon nitride, silicon oxynitride, nickel-chrome alloys, zirconium, aluminum, alloys of silicon and aluminum, alloys containing cobalt and chromium, or mixtures thereof.

Clause 72: The method according to any of the clauses 42 to 71, wherein the primer layer comprise a total thickness in the range of 20 Å to 40 Å.

Clause 73: The method according to any of the clauses 56 to 72, wherein the third dielectric layer comprises zinc oxide, and zinc stannate over at least a portion of the zinc oxide.

Clause 74: The method according to any of the clauses 56 to 73, wherein the third dielectric layer comprises a total thickness in the range of 150 Å to 300 Å.

Clause 75: The method according to any of the clauses 41 to 74, wherein the substrate is glass.

EXAMPLES

It will be readily appreciated by one of ordinary skill in the art that modifications may be made to the invention without departing from the concepts disclosed in the foregoing description. Accordingly, the particular embodiments described in detail herein are illustrative only and are not limited to the scope of the invention, which is to be given the full breadth of the appended claims and any and all equivalents thereof.

Example 1

Coated articles 10 were made by incorporating a light absorbing layer 100 into different locations in the stack. The light absorbing layer was deposited under 100% Argon for metal alloy light absorbing layers and deposited under 20% to 40% oxygen to form a suboxide. In one embodiment, the light absorbing layer 100 was positioned between the ZnSn film 114 of the first dielectric layer 14 and substrate 12 (FIG. 1A, FIG. 1B, FIG. 1C, and FIG. 1D), between the primer layer 18 and zinc oxide film 120 of the second dielectric layer 20 (FIG. 2A, FIG. 2B, FIG. 2C, and FIG. 2D), and between the zinc oxide film 120 and ZnSn film 122 of the second dielectric layer 20 (FIG. 3A, FIG. 3B, FIG. 3C, and FIG. 3D). The coated articles 10 were analyzed for light transmittance and color and resulted in substrates with a hazy finish.

Example 2

Figure 4A:
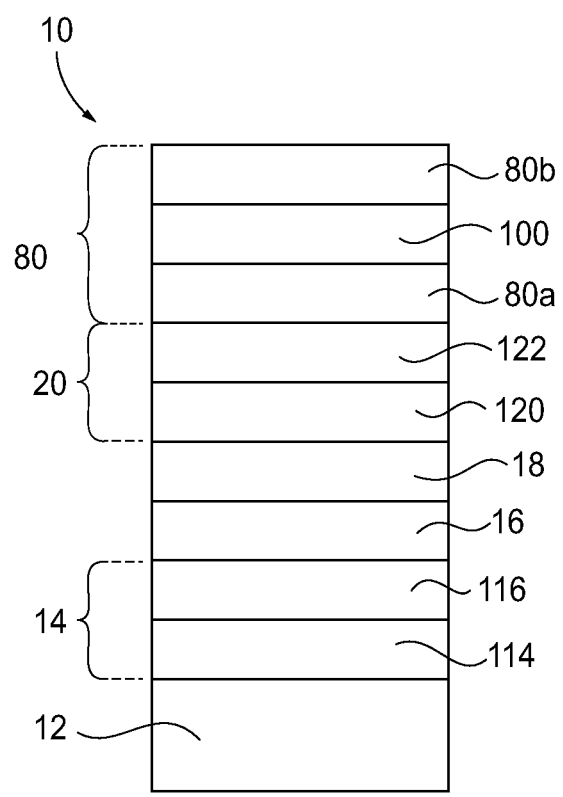
FIGS. 4A-4D: A side view (not to scale) diagram of a coated article incorporating features of the invention, wherein a light absorbing layer is positioned within the overcoat for a single metallic layer coating stack (FIG. 4A), a double metallic layer coating stack (FIG. 4B), a triple metallic layer coating (FIG. 4C), and a quadruple metallic layer coating (FIG. 4D).
Figure 4B:
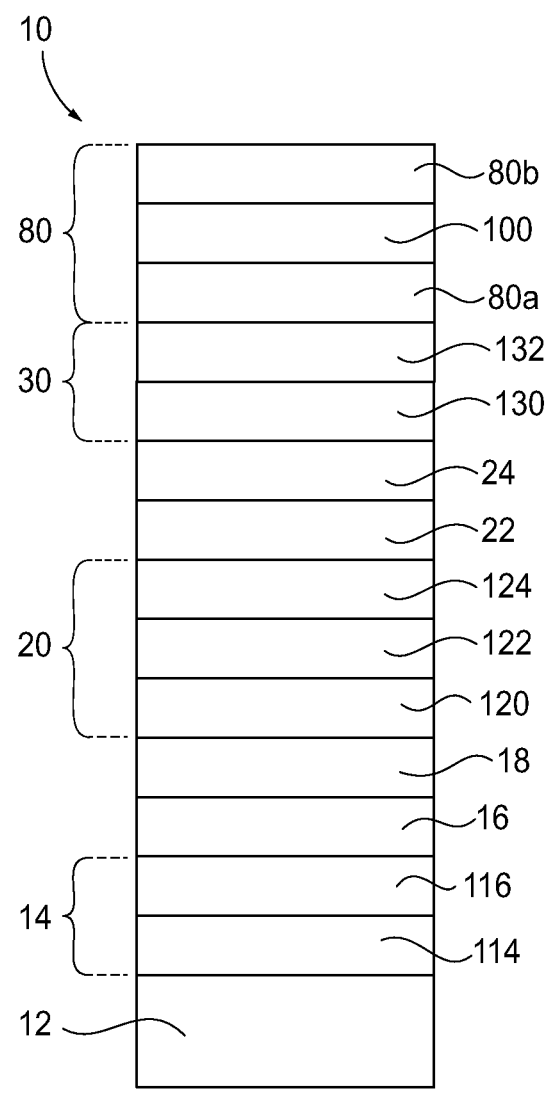
Figure 4C:
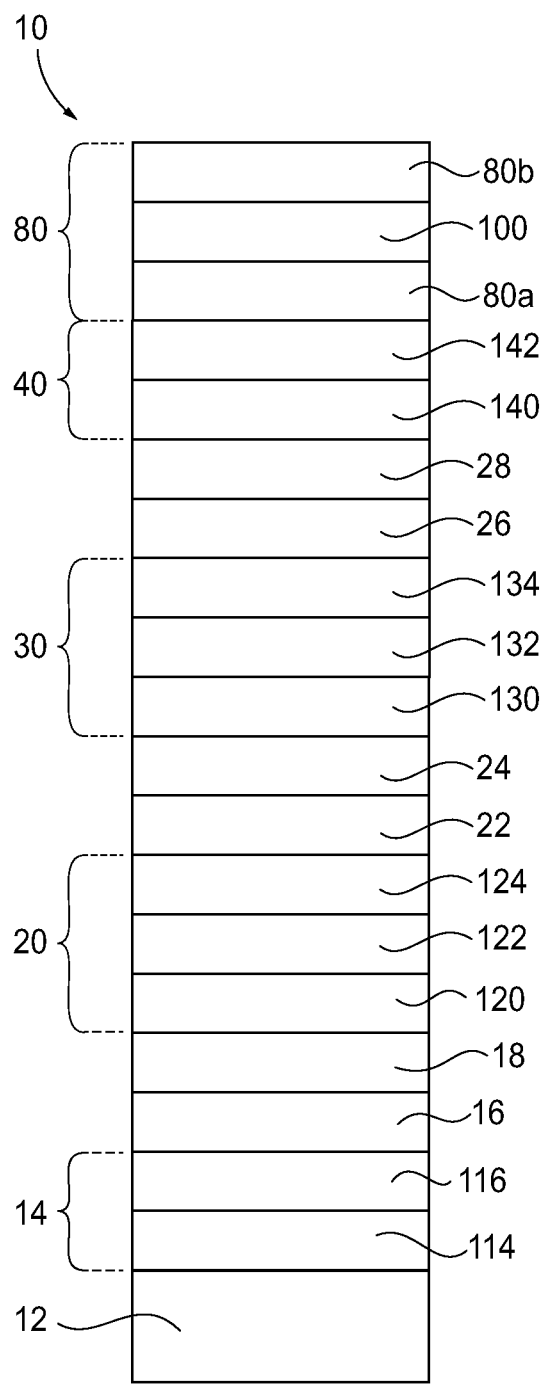
Figure 4D:
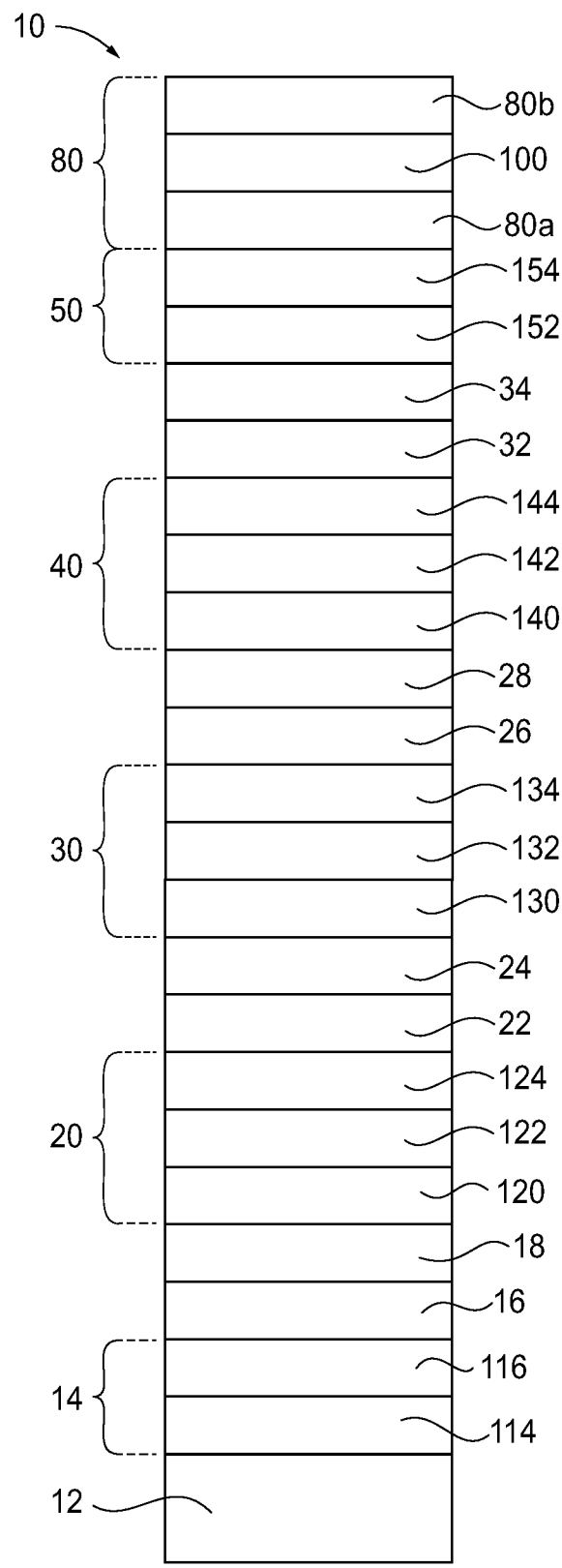

The coated article 10 of FIG. 4B was made with $Si_aCo_bO_x$ as the light absorbing layer, where Si was 50 wt. % and Co was 50 wt. % deposited under a 20%-30% $O_2$ atmosphere (i.e. an atmosphere created when 20%-30% $O_2$ is pumped into the chamber where the $Si_aCo_bO_x$ is deposited) and had the following structure:

| | |
|---|---|
| Si85Al15 PPO | 530 Å |
| light absorber | 600 Å |
| Si85Al15 PPO | 20 Å |
| zinc stannate | 180 Å |
| zinc oxide | 90 Å |
| titanium | 20-40 Å |
| silver | 80 Å |
| zinc oxide | 70 Å |
| zinc stannate | 710 Å |
| zinc oxide | 60 Å |
| titanium | 20-40 Å |
| silver | 105 Å |
| zinc oxide | 60 Å |
| zinc stannate | 340 Å |
| clear glass | 2.1 mm |

The light absorbing layer 100 was positioned within the Si85Al15 PPO overcoat layer 80 (80a and 80b). The resulting coated article 10 was analyzed for light transmittance and color (Table 3). When the light absorbing layer 100 was positioned within the Si85Al15 PPO layer 80, no haze and decreased light transmittance (LTA) was observed.

Example 3

Figure 5C:
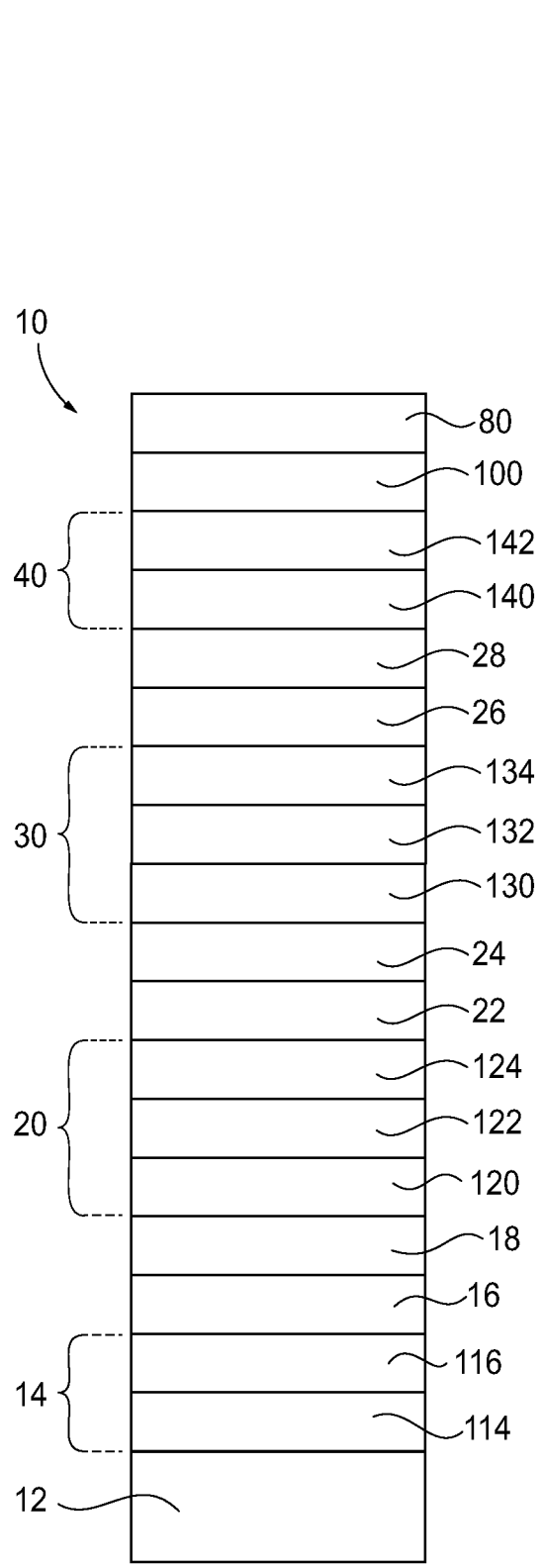
Figure 5D:
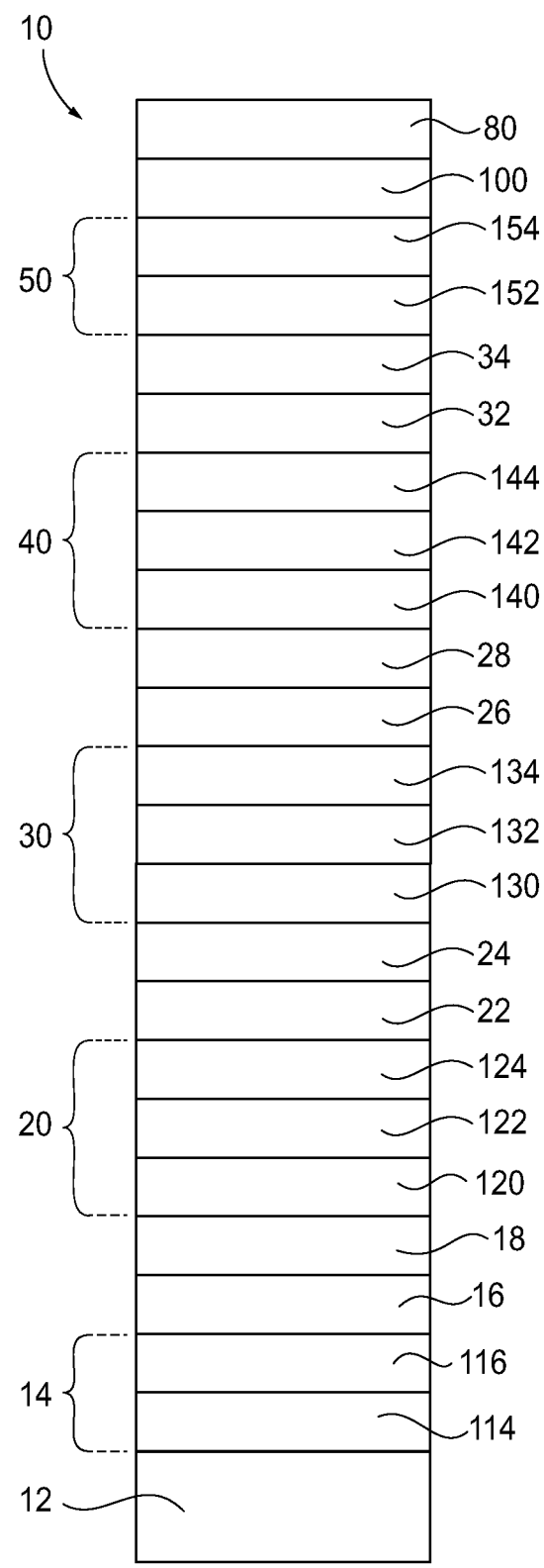

The coated article 10 of FIG. 5B was made with $Si_aCo_b$ as the light absorbing layer, where Si was 50 wt. % and Co was 50 wt. % deposited under a 100% Ar atmosphere and had the following structure:

| | |
|---|---|
| Si85Al15 PPO | 530 Å |
| light absorber | 25 Å |
| zinc stannate | 180 Å |
| zinc oxide | 90 Å |
| titanium | 20-40 Å |
| silver | 80 Å |
| zinc oxide | 70 Å |
| zinc stannate | 710 Å |
| zinc oxide | 60 Å |
| titanium | 20-40 Å |
| silver | 105 Å |
| zinc oxide | 60 Å |
| zinc stannate | 340 Å |
| clear glass | 2.1 mm |

The light absorbing layer 100 was inserted between the ZnSn layer 132 of the third dielectric layer 30 and the Si85Al15 PPO overcoat 80. The resulting coated article was analyzed for light transmittance and color (Table 3). When the light absorbing layer 100 was inserted between the third dielectric layer 30 and the Si85Al15 PPO overcoat 80, no haze and decreased LTA was observed. Increasing the thickness of $Si_aCo_b$ from 25 Å to 30 Å further reduced the LTA but caused a change in the Rg color, as a result of oxidation within the coated stack.

TABLE 3

| SiCo Light Absorber | Sample | L* | a* | b* | DEcmc | LTA (%) |
|---|---|---|---|---|---|---|
| Baseline 10 | T | 89.571 | −1.236 | 4.378 | −99 | 75.817 |
| | Rf | 39.387 | −7.450 | −2.549 | −99 | |
| | Rg | 39.364 | −5.805 | −1.000 | −99 | |
| $Si_aCo_bO_x$ (100 within 80) | T | 87.187 | −0.919 | 5.453 | −99 | 71.071 |
| | Rf | 40.498 | −2.675 | −1.163 | −99 | |
| | Rg | 42.116 | −4.364 | −3.303 | −99 | |
| $Si_aCo_b$ (100 at 25 Å between 132 and 80) | T | 88.769 | −1.892 | 5.383 | −99 | 74.088 |
| | Rf | 39.368 | −6.879 | −3.086 | −99 | |
| | Rg | 39.724 | −9.438 | −1.828 | −99 | |
| $Si_aCo_b$ (100 at 30 Å between 132 and 80) | T | 85.956 | −1.4959 | 6.734 | −99 | 68.619 |
| | Rg | 38.592 | −6.768 | −7.950 | −99 | |

Example 4

The coated article 10 of FIG. 4B was made with a $Si_aNi_b$ light absorbing layer 100, where Si was 50 wt. % and Ni was 50 wt. %, deposited under 100% Ar and had the following structure:

| | |
|---|---|
| Si85Al15 PPO | 530 Å |
| light absorber | 100 Å |
| Si85Al15 PPO | 100 Å |
| zinc stannate | 180 Å |
| zinc oxide | 90 Å |
| titanium | 20-40 Å |
| silver | 80 Å |
| zinc oxide | 70 Å |
| zinc stannate | 710 Å |
| zinc oxide | 60 Å |
| titanium | 20-40 Å |
| silver | 105 Å |
| zinc oxide | 60 Å |
| zinc stannate | 340 Å |
| clear glass | 2.1 mm |

The light absorbing layer 100 was positioned within the Si85Al15 PPO overcoat 80 (80a and 80b). The resulting coated article 10 was analyzed for light transmittance and color. When the light absorbing layer was positioned within the Si85Al15 PPO overcoat 80, no haze was observed. However, following sample heating in a 0% oxygen environment, the coated article 10 became hazy.

Example 5

The coated article 10 of FIG. 5B was made with $Si_aNi_bO_x$ light absorbing layer, where Si was 50 wt. % and Ni was 50 wt. %, deposited under a 10% $O_2$ atmosphere and had the following structure:

| | |
|---|---|
| Si85Al15 PPO | 530 Å |
| light absorber | 100 Å |
| zinc stannate | 180 Å |
| zinc oxide | 90 Å |
| titanium | 20-40 Å |
| silver | 80 Å |
| zinc oxide | 70 Å |
| zinc stannate | 710 Å |
| zinc oxide | 60 Å |
| titanium | 20-40 Å |
| silver | 105 Å |
| zinc oxide | 60 Å |
| zinc stannate | 340 Å |
| clear glass | 2.1 mm |

The light absorbing layer 100 was positioned within the Si85Al15 PPO overcoat 80. The resulting coated article 10 was analyzed for light transmittance and color. When the light absorbing layer was inserted in the Si85Al15 PPO layer 80, no haze was observed. However, following sample heating in a 0% oxygen environment, the coated article 10 became hazy.

Example 6

The coated article 10 of FIG. 5B was made with a $Si_aCr_bO_x$ light absorbing layer, where Si was 28 wt. % and Cr was 52 wt. %, deposited under a 20% $O_2$ atmosphere. When the light absorbing layer was inserted between the third dielectric layer 30 and the overcoat 80, no haze observed.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coated article comprising:
   a substrate; and
   a coating applied over at least a portion of the substrate, the coating comprising:
      a first dielectric layer over at least a portion of the substrate;
      a first metallic layer over at least a portion of the first dielectric layer;
      a second dielectric layer over at least a portion of the first metallic layer; and
      an overcoat comprising a light absorbing layer,
      wherein the overcoat further comprises two protective films consisting of silica, alumina, or mixtures thereof over at least a portion of the second dielectric layer,
   wherein the light absorbing layer comprises Ge, $GeO_x$, Hf, $HfO_x$, $HfO_2$, $NbN_x$, $NbN_xO_y$, $Si_aAl_b$, $Si_aAl_bO_x$, $Si_aCo_b$, $Si_aCo_bO_x$, $Si_aCO_bCu_c$, $Si_aCo_bCu_cO_x$, $Si_aCr_b$, $Si_aCr_bO_x$, $Si_aNi_b$, $SiNiO_x$, $SiO_x$, $SnN_x$, $SnO_x$, $SnO_xN_y$, $TiN_x$, $Ti_aNb_bN_x$, $Ti_aNb_bO_x$, $Ti_aNb_bO_xN_y$, $TiO_xN_y$, $WO_x$, $WO_2$, ZnO:Co, ZnO:Fe, ZnO:Mn, ZnO:Ni, ZnO:V, ZnO:Cr, $Zn_aSn_b$, $Zn_aSn_bO_x$, or any combination thereof,
   wherein a, b, and c are weight percentages of an element,
   wherein b is less than or equal to 1−a,
   wherein c is less than or equal to 1−a−b, and
   wherein x and y are weight percentages in the range of 0 weight percent to any number being a full oxide and/or nitride.

2. The coated article of claim 1, wherein the light absorbing layer comprises $Si_aAl_b$, $Si_aAl_bO_x$, $Si_aCo_b$, $Si_aCo_bO_x$, $Si_aCo_bCu_c$, $Si_aCo_bCu_cO_x$, $Si_aCr_b$, $Si_aCr_bO_x$, $Si_aNi_b$, $SiNiO_x$, $SiO_x$, or any combination thereof.

3. The coated article of claim 1, wherein the light absorbing layer comprises $TiN_x$, $Ti_aNb_bN_x$, $Ti_aNb_bO_x$, $Ti_aNb_bO_xN_y$, $TiO_xN_y$, or a combination thereof.

4. The coated article of claim 1, wherein the light absorbing layer comprises $NbN_x$, $NbO_xN_y$, $Ti_aNb_bN_x$, $Ti_aNb_bO_x$, $Ti_aNb_bO_xN_y$, or a combination thereof.

5. The coated article of claim 1, wherein the light absorbing layer comprises $SnN_x$, $SnO_x$, $Zn_aSn_b$, $Zn_aSn_bO_x$, or a combination thereof.

6. The coated article of claim 1, wherein the light absorbing layer comprises ZnO:Co, ZnO:Fe, ZnO:Mn, ZnO:Ni, ZnO:V, ZnO:Cr, or a combination thereof.

7. The coated article of claim 1, wherein the light absorbing layer comprises Ge, $GeO_x$, Hf, $HfO_x$, $WO_x$, $WO_2$, or a combination thereof.

8. The coated article of claim 1, wherein the light absorbing layer comprises $Si_aCo_bO_x$, wherein a is in the range of 30 wt. % to 50 wt. %.

9. The coated article of claim 1, wherein the light absorbing layer comprises $Si_aCo_bO_x$ and wherein x is a resulting oxygen content when the light absorbing material is formed under an atmosphere having 20% to 40% of oxygen.

10. The coated article of claim 1, further comprising a second metallic layer over at least a portion of the second dielectric layer and a third dielectric layer over at least a portion of the second metallic layer, and
    wherein the overcoat is over at least a portion of the third dielectric layer.

11. The coated article of claim 10, further comprising a third metallic layer over at least a portion of the third dielectric layer, and a fourth dielectric layer over at least a portion of the third metallic layer,
    wherein the overcoat is over at least a portion of the fourth dielectric layer.

12. The coated article of claim 11, further comprising a fourth metallic layer over at least a portion of the fourth dielectric layer, and a fifth dielectric layer over at least a portion of the fourth metallic layer,
    wherein the overcoat is over at least a portion of the fifth dielectric layer.

13. The coated article of claim 10, wherein at least one of the metallic layers is a discontinuous metallic layer.

14. The coated article of claim 10, further comprising at least one primer layer formed over at least one of the metallic layers.

15. The coated article of claim 1, wherein the substrate is glass.

16. The coated article of claim 1, wherein the overcoat is silicon aluminum oxide.

17. The coated article of claim 1, wherein the overcoat comprises a total thickness in the range of 400 Å to 750 Å.

18. A coated article comprising:
    a glass substrate; and
    a coating applied over at least a portion of the glass substrate, the coating comprising:
       a first dielectric layer over at least a portion of the substrate;
       a first metallic layer over at least a portion of the first dielectric layer;
       a second dielectric layer over at least a portion of the first metallic layer;
       a second metallic layer over at least a portion of the second dielectric layer;
       a third dielectric layer over at least a portion of the third dielectric layer; and
       an overcoat comprising a light absorbing layer,
       wherein the overcoat further comprises two protective films consisting of silica, alumina, or mixtures thereof over at least a portion of the third dielectric layer,
    wherein at least one of the metallic layers is a continuous metallic layer and at least one primer layer is over at least one of the metallic layers,
    wherein the light absorbing layer comprises Ge, $GeO_x$, Hf, $HfO_x$, $HfO_2$, $NbN_x$, $NbN_xO_y$, $Si_aAl_b$, $Si_aAl_bO_x$, $Si_aCo_b$, $Si_aCo_bO_x$, $Si_aCO_bCu_c$, $Si_aCo_bCu_cO_x$, $Si_aCr_b$, $Si_aCr_bO_x$, $Si_aNi_b$, $SiNiO_x$, $SiO_x$, $SnN_x$, $SnO_x$, $SnO_xN_y$, $TiN_x$, $Ti_aNb_bN_x$, $Ti_aNb_bO_x$, $Ti_aNb_bO_xN_y$, $TiO_xN_y$, $WO_x$, $WO_2$, ZnO:Co, ZnO:Fe, ZnO:Mn, ZnO:Ni, ZnO:V, ZnO:Cr, $Zn_aSn_b$, $Zn_aSn_bO_x$, or any combination thereof,
    wherein a, b, and c are weight percentages of an element,
    wherein b is less than or equal to 1−a,
    wherein c is less than or equal to 1−a−b, and
    wherein x and y are weight percentages in the range of 0 weight percent to any number being a full oxide and/or nitride.

19. The coated article of claim 18 further comprising a primer positioned over at least a portion of the first metallic layer or the second metallic layer.

20. A method of making a coated article:
    providing a substrate; and
    applying a coating over at least a portion of the substrate, wherein the applying step comprises:
       forming a first dielectric layer over at least a portion of the substrate;
       forming a first metallic layer over at least a portion of the first dielectric layer;

forming a second dielectric layer over at least a portion of the first metallic layer; and forming an overcoat comprising a light absorbing layer, wherein the overcoat further comprises two protective films comprising silica, alumina, or mixtures thereof over at least a portion of the second dielectric layer, wherein the light absorbing layer comprises Ge, $GeO_x$, Hf, $HfO_x$, $HfO_2$, $NbN_x$, $NbN_xO_y$, $Si_aAl_b$, $Si_aAl_bO_x$, $Si_aCo_b$, $Si_aCo_bO_x$, $Si_aCO_bCu_c$, $Si_aCo_bCu_cO_x$, $Si_aCr_b$, $Si_aCr_bO_x$, $Si_aNi_b$, $SiNiO_x$, $SiO_x$, $SnN_x$, $SnO_x$, $SnO_xN_y$, $TiN_x$, $Ti_aNb_bN_x$, $Ti_aNb_bO_x$, $Ti_aNb_bO_xN_y$, $TiO_xN_y$, $WO_x$, $WO_2$, ZnO:Co, ZnO:Fe, ZnO:Mn, ZnO:Ni, ZnO:V, ZnO:Cr, $Zn_aSn_b$, $Zn_aSn_bO_x$, or any combination thereof, wherein a, b, and c are weight percentages of an element, wherein b is less than or equal to 1−a, wherein c is less than or equal to 1−a−b, and wherein x and y are weight percentages in the range of 0 weight percent to any number being a full oxide and/or nitride.

21. The method of claim 20 further comprising forming a primer over at least a portion of the first metallic layer.

\* \* \* \* \*

UNITED STATES PATENT AND TRADEMARK OFFICE
CERTIFICATE OF CORRECTION

PATENT NO. : 11,709,297 B2
APPLICATION NO. : 16/578659
DATED : July 25, 2023
INVENTOR(S) : Zhixun Ma et al.

Page 1 of 1

It is certified that error appears in the above-identified patent and that said Letters Patent is hereby corrected as shown below:

In the Claims

Column 21, Line 20, Claim 1, delete "$Si_aCO_bCu_c$," and insert -- $Si_aCo_bCu_c$, --

Column 22, Line 45, Claim 18, delete "$Si_aCO_bCu_c$," and insert -- $Si_aCo_bCu_c$, --

Column 23, Line 9, Claim 20, delete "$Si_aCO_bCu_c$," and insert -- $Si_aCo_bCu_c$, --

Signed and Sealed this
Nineteenth Day of September, 2023

Katherine Kelly Vidal
*Director of the United States Patent and Trademark Office*